(12) United States Patent
Inagaki et al.

(10) Patent No.: US 7,037,360 B2
(45) Date of Patent: May 2, 2006

(54) ADSORBENT FOR HEAT UTILIZATION SYSTEM, ADSORBENT FOR REGENERATOR SYSTEM, REGENERATOR SYSTEM COMPRISING THE ADSORBENT, FERROALUMINOPHOSPHATE AND METHOD FOR PRODUCTION THEREOF

(75) Inventors: Kouji Inagaki, Aichi (JP); Atsushi Kosaka, Aichi (JP); Satoshi Inoue, Aichi (JP); Yasukazu Aikawa, Aichi (JP); Takahiko Takewaki, Kanagawa (JP); Masanori Yamazaki, Kanagawa (JP); Hiromu Watanabe, Kanagawa (JP); Hiroyuki Kakiuchi, Mie (JP); Miki Iwade, Okayama (JP)

(73) Assignees: Mitsubishi Chemical Corporation, Tokyo (JP); Denso Corporation, Kariya (JP)

( * ) Notice: Subject to any disclaimer, the term of this patent is extended or adjusted under 35 U.S.C. 154(b) by 175 days.

(21) Appl. No.: 10/638,357

(22) Filed: Aug. 12, 2003

(65) Prior Publication Data
US 2004/0093876 A1    May 20, 2004

(30) Foreign Application Priority Data
Aug. 15, 2002  (JP) .................... P. 2002-236882

(51) Int. Cl.
*B01D 53/04* (2006.01)
(52) U.S. Cl. ............... 96/126; 95/120; 95/902; 96/143; 96/146; 55/385.3; 62/112; 502/74; 502/414
(58) Field of Classification Search ............... 55/385.3; 62/112, 238.2; 95/117, 902, 120–126; 96/126–128, 96/130, 143, 146; 502/66, 67, 74, 414
See application file for complete search history.

(56) References Cited

U.S. PATENT DOCUMENTS

| | | | | |
|---|---|---|---|---|
| 4,440,871 A | * | 4/1984 | Lok et al. | 502/214 |
| 4,554,143 A | | 11/1985 | Messina et al. | |
| 4,744,885 A | * | 5/1988 | Messina et al. | 208/114 |
| 4,861,739 A | * | 8/1989 | Pellet et al. | 502/64 |
| 4,861,743 A | * | 8/1989 | Flank et al. | 502/214 |
| 5,879,655 A | * | 3/1999 | Miller et al. | 423/702 |
| 6,406,521 B1 | * | 6/2002 | Cheng et al. | 95/98 |

FOREIGN PATENT DOCUMENTS

| | | |
|---|---|---|
| EP | 0 103 117 | 3/1984 |
| EP | 0 159 624 | 10/1985 |
| EP | 0 161 491 | 11/1985 |
| EP | 0 770 836 | 5/1997 |
| JP | 1-267346 | 10/1989 |

OTHER PUBLICATIONS

A. Ristic, et al., Elsevier Science Inc, Microporous and Mesoporous Materials, vol. 56, pp. 303-315, "Synthesis and Characterization of Triclinic MeAPO-34 (Me=Zn, Fe) Molecular Sieves", 2002.

* cited by examiner

*Primary Examiner*—Robert H. Spitzer
(74) *Attorney, Agent, or Firm*—Oblon, Spivak, McClelland, Maier & Neustadt, P.C.

(57) ABSTRACT

An adsorbent for regenerator systems, to a heat utilization system and a regenerator system that comprise the adsorbent, and to a ferroaluminophosphate and a method for production thereof. More precisely, the invention relates to an adsorbent favorable for regenerator systems, which efficiently utilizes the heat source obtainable from cars and the like to thereby realize efficient regenerator systems, to a regenerator system that comprises the adsorbent, to a ferroaluminophosphate to be the adsorbent favorable for regenerator systems, and to a method for production thereof.

28 Claims, 14 Drawing Sheets

Heat Accumulation Mode

Warming-up and Auxiliary Cooling Mode

Auxiliary Cooling Priority Mode (a)

(b)

ADSORBENT FOR HEAT UTILIZATION SYSTEM, ADSORBENT FOR REGENERATOR SYSTEM, REGENERATOR SYSTEM COMPRISING THE ADSORBENT, FERROALUMINOPHOSPHATE AND METHOD FOR PRODUCTION THEREOF

FIELD OF THE INVENTION

The present invention relates to an adsorbent for regenerator systems, to a heat utilization system and a regenerator system that comprise the adsorbent, and to a ferroaluminophosphate and a method for production thereof. More precisely, the invention relates to an adsorbent favorable for regenerator systems, which efficiently utilizes the heat source obtainable from cars and the like to thereby realize efficient regenerator systems, to a regenerator system that comprises the adsorbent, to a ferroaluminophosphate to be the adsorbent favorable for regenerator systems, and to a method for producing it.

BACKGROUND OF THE INVENTION

Utilizing the waste heat much generated by vehicles and others is now under investigation. A regenerator system for vehicles that utilizes the waste heat generated by vehicles is described, for example, in JP-A 1-267346. According to this, the waste heat from an engine in the vehicle that is running is applied to a hydrogen occlusion alloy to thereby make the alloy release hydrogen gas, the thus-released hydrogen gas is absorbed by the alloy at the time of engine start, and the reaction heat thus generated by the alloy is supplied to the devices to be warmed up to thereby promote the engine warming up in a vehicle to be driven. In the regenerator system for vehicles, the waste heat is effectively accumulated and is efficiently utilized, but is not utilized in a cooler (air conditioner) that is a typical heat utilization system in vehicles. In this, therefore, the waste heat is not always effectively utilized.

On the other hand, an adsorption-type regenerator apparatus that utilizes the heat adsorbed by an adsorbent is known for heat utilization in cooling systems. The regenerator system equipped with such an adsorption-type regenerator apparatus is installed in buildings, houses, vehicles and others, in which the waste heat or hot heat generated by it is utilized for effective recycling of energy resources. In the regenerator system of the type, a desorption process of heating the adsorbent so as to desorb the adsorbate such as water from it and an adsorption process of cooling the adsorbent from which the adsorbate has been desorbed to thereby make the adsorbent again adsorb the adsorbate are repeated to drive the system. For efficient repetition of the desorption process and the adsorption process in the system, the adsorbent that adsorbs and desorbs an adsorbate must have adequate adsorption characteristics that correspond to the heat source to be applied to the system.

In general, the heat obtainable from cooling water or solar heat in cogeneration units, fuel cells, car engines and others is relatively at low temperature of at most 120° C., mostly at most 105° C., more mostly at around 60 to 100° C. or so. Accordingly, it is desired to develop an adsorbent capable of realizing efficient adsorption and desorption of adsorbate even for such low-temperature waste heat.

Above all, practical use of compact regenerator systems equipped with such an adsorbent is earnestly desired for automobiles that generate much waste heat and therefore have a problem in that the fuel efficiency is further lowered by the use of air conditioners therein, as so mentioned hereinabove.

SUMMARY OF THE INVENTION

Y-type zeolite has heretofore been investigated for the adsorbent in a regenerator system that utilizes the heat of adsorption and desorption by the adsorbent therein. However, since this adsorbs an adsorbate even at a relative vapor pressure of approximately 0, this requires a high temperature for desorbing the adsorbate from it at the relative vapor pressure of approximately 0. Therefore, Y-type zeolite is problematic in that it could not be used in the above-mentioned regenerator system that utilizes low-temperature waste heat.

A-type silica gel has also been investigated for the same purpose. However, its adsorption characteristic at low relative vapor pressure is not good, and, in addition, mesoporous silica (e.g., FSM-10) synthesized by the use of a micelle structure of surfactant as a template (see JP-A 9-178292) does not adsorb an adsorbate at low relative vapor pressure. Therefore, the problem with such A-type silica gel is that it could not be used in constituting a regenerator system that utilizes the heat to be obtained from cooling water or solar heat as in the above-mentioned cogeneration devices, fuel cells, car engines, etc.

Further, mesoporous silica is readily broken and is generally said to be expensive. On the other hand, Y-type zeolite and A-type silica gel are inexpensive and are hardly broken, but in our experiments with them, we have found that their performance is unsatisfactory.

The present invention has been made in order to solve the problems as above, and its object is to provide an efficient heat utilization system capable of effectively utilizing the heat source obtainable from automobiles and others, more concretely, an adsorbent favorable for heat utilization systems capable of realizing regenerator systems, even more concretely an adsorbent for regenerator systems; to provide a heat utilization system and a regenerator system that comprise the adsorbent; and to provide a ferroaluminophosphate favorable to the adsorbent for regenerator systems, and a method for producing it.

The present inventors have extensively studied to solve the problems noted above. As a result, have found that an adsorbent which satisfies a specific relationship between the relative vapor pressure (this is the same as the relative humidity, and the same shall apply hereinunder) and the adsorption amount thereof is favorable for heat utilization systems, concretely for regenerator systems, especially for those to be mounted on vehicles, and, on the basis of this finding, we have reached the present invention.

[1] The heat utilization system of the invention that solves the above-mentioned problems is to utilize the heat of adsorption generated while an adsorbent adsorbs an adsorbate and/or the latent heat of vaporization generated while the adsorbate vaporizes and is adsorbed to the adsorbent, and this is characterized in that the adsorbent is zeolite, and (a) the framework density of the zeolite falls between 10 T/nm$^3$ and 18 T/nm$^3$, and (b) on the adsorption isotherm thereof measured at 55° C., the adsorbate adsorption amount by the zeolite is at most 0.12 g/g at a relative vapor pressure of 0.02 and is at least 0.13 g/g at a relative vapor pressure of 0.1, and the zeolite has a relative vapor pressure region to give an adsorbate adsorption amount change of at least 0.08 g/g when the relative vapor pressure thereof has changed by 0.05 in a range of the relative vapor pressure thereof of from 0.02 to 0.1.

[2] The regenerator system of the invention that solves the problems is (1) for feeding waste heat to an adsorbent so as to desorb the adsorbate from it and to feed the heat that is generated while the adsorbent adsorbs the adsorbate, to the devices to be warmed up, and/or (2) for feeding waste heat to an adsorbent so as to desorb the adsorbate from it and to feed the latent heat of vaporization generated while the adsorbate vaporizes and is adsorbed to the adsorbent, to the cooling medium that circulates inside a refrigerator for cooling, and this is characterized in that the adsorbent is zeolite, and the framework density of the zeolite falls between 10 T/nm³ and 18 T/nm³, and, on the adsorption isotherm thereof measured at 55° C., the adsorbate adsorption amount by the zeolite is at most 0.12 g/g at a relative vapor pressure of 0.02 and is at least 0.13 g/g at a relative vapor pressure of 0.1, and the zeolite has a relative vapor pressure region to give an adsorbate adsorption amount change of at least 0.08 g/g when the relative vapor pressure thereof has changed by 0.05 in a range of the relative vapor pressure thereof of from 0.02 to 0.1.

Preferably, the heat utilization system and the regenerator system of the invention are mounted on vehicles, and in these, the waste heat is generated by the warmed-up internal combustion engine in vehicles, and the device to be warmed up is the internal combustion engine. Also preferably, the refrigerator for cooling is a vapor pressure compression refrigerator, and the adsorbate is preferably water.

[3] The adsorbent of the invention that solves the above-mentioned problems is for the heat utilization system or the regenerator system mentioned above, and it is zeolite that is characterized in that (a) the framework density of the zeolite falls between 10 T/nm³ and 18 T/nm³, and (b) on the adsorption isotherm thereof measured at 55° C., the adsorbate adsorption amount by the zeolite is at most 0.12 g/g at a relative vapor pressure of 0.02 and is at least 0.13 g/g at a relative vapor pressure of 0.1, and the zeolite has a relative vapor pressure region to give an adsorbate adsorption amount change of at least 0.08 g/g when the relative vapor pressure thereof has changed by 0.05 in a range of the relative vapor pressure thereof of from 0.02 to 0.1.

Preferably, the zeolite is any of (1) an aluminophosphate having at least Al and P in its framework structure, or (2) a metalloaluminophosphate having at least a hetero atom, Al and P in its framework structure, or (3) a metalloaluminophosphate that comprises a hetero atom, Al and P to constitute a framework structure in a molar ratio of the following formulae (a) to (c):

$$0.001 \leq x \leq 0.4 \quad (a)$$

wherein x indicates a molar ratio of the hetero atom to the total of the hetero atom, Al and P;

$$0.2 \leq y \leq 0.6 \quad (b)$$

wherein y indicates a molar ratio of Al to the total of the hetero atom, Al and P;

$$0.2 \leq z \leq 0.6 \quad (c)$$

wherein z indicates a molar ratio of P to the total of the hetero atom, Al and P, or (4) a silicoaluminophosphate that contains silicon as the hetero atom in the framework structure thereof, or (5) a silicoaluminophosphate which has a framework density of from 10 T/nm³ to 16 T/nm³ and in which the molar ratio of Si to the total of Si, Al and P is larger than 9%, or (6) a silicoaluminophosphate which has a framework density of from 10 T/nm³ to 16 T/nm³ and in which Si, Al and P constitute the framework structure thereof in a molar ratio of the following formulae (4) to (6):

$$0.09 < p \leq 0.30 \quad (4)$$

wherein p indicates a molar ratio of Si to the total of Si, Al and P;

$$0.30 \leq q \leq 0.60 \quad (5)$$

wherein q indicates a molar ratio of Al to the total of Si, Al and P;

$$0.30 \leq r \leq 0.60 \quad (6)$$

wherein r indicates a molar ratio of P to the total of Si, Al and P, or (7) a ferroaluminophosphate that contains iron as the hetero atom in the framework structure thereof.

The adsorbent of the invention having the characteristics as above makes it possible that, on the adsorption isotherm thereof measured at 55° C., <1> the adsorbate adsorption amount by the zeolite is at most 0.12 g/g at a relative vapor pressure of 0.02, <2> the adsorbate adsorption amount by it is at least 0.13 g/g at a relative vapor pressure of 0.1, and <3> the zeolite has a relative vapor pressure region to give an adsorbate adsorption amount change of at least 0.08 g/g when the relative vapor pressure thereof has changed by 0.05 in a range of the relative vapor pressure thereof of from 0.02 to 0.1.

Specifically, <1> the adsorbent, zeolite makes it possible that the adsorbate adsorption amount by it is at most 0.12 g/g at a relative vapor pressure of 0.02, and this means that the adsorbent exhibits excellent desorption performance under the relative vapor pressure condition. The relative vapor pressure condition is derived from a relatively low-temperature heating condition for desorption, and this means that an adsorbate may be readily and efficiently desorbed from the adsorbent even at a relatively low-temperature heating condition of approximately up to 100° C. or so, for example, in waste heat from cogeneration devices, fuel cells, automobile engines, etc. Further, <2> the adsorbent makes it possible that the adsorbate adsorption amount by it is at least 0.13 g/g at a relative vapor pressure of 0.1, and this means that the adsorbent exhibits excellent adsorption performance under the relative vapor pressure condition. The relative vapor pressure condition is derived from a relatively high-temperature heating condition for adsorption, and this means that an adsorbate may be readily and efficiently adsorbed to the adsorbent even at a relatively high-temperature cooling condition with cooling water of approximately from 45 to 60° C. or so, for example in radiators in automobiles, etc. Moreover, <3> the adsorbent may have a relative vapor pressure region to give a large adsorbate adsorption amount change of at least 0.08 g/g when the relative vapor pressure thereof has changed by 0.05 in a range of the relative vapor pressure thereof of from 0.02 to 0.1, and this means that even when the difference between the heating temperature for adsorbate desorption and the cooling temperature for adsorbate adsorption is small, the adsorbent attains favorable and efficient adsorption/desorption cycles. As a result, the adsorbent of the invention may be effectively applicable even to regenerator systems as in automobiles and the like, in which the heating temperature is at most 100° C. or so and the cooling temperature is from 45 to 60° C. or so and the temperature difference between them is every small. Accordingly, the special advantages of the invention are that it contributes toward the reduction in the overall amount of the adsorbent to be used and toward the reduction of the overall size of the system.

When the adsorbent of the invention is applied to, for example, regenerator systems for vehicles, then the waste heat generated by the internal combustion engine can be effectively utilized in the process of desorbing the adsorbate from the adsorbent, and the heat (heat of adsorption) that is generated by the adsorbate adsorbed to the adsorbent may be fed to the devices to be warmed up in vehicles, for example, to the internal combustion (engine) therein, or the latent heat of evaporation of the adsorbate that is adsorbed to the adsorbent to evaporate can be fed to a coolant medium that circulates inside the refrigerators for cooling, for example, in vapor pressure compression-type refrigerators (automobile air conditioners). Accordingly, the specific advantages of the invention to the effect are that the waste heat much generated by vehicles is effectively recycled, the fuel efficiency reduction owing to the air conditioner operation may be prevented, and the regenerator system to be in vehicles can be down-sized.

Regarding the supply of the heat of adsorption and the supply of the latent heat of vaporization mentioned above, any one of them may be supplied to the system. Preferably, however, one system has the advantage of both the supply of the heat of adsorption and the supply of the latent heat of vaporization thereto for better utilization of the waste heat as above.

In particular, automobiles equipped with a regenerator system that is so designed that the latent heat of vaporization is supplied to a coolant medium that circulates in an air conditioner fitted thereto are effective in that the air conditioner (cooler) could be driven even when the engine is stopped while waiting for the traffic signals to change.

(3) The ferroaluminophosphate, which is preferred in the invention for solving the problems as above, has at least Fe, Al and P in the framework structure thereof and is characterized in that its powdery X-ray diffractiometry with a Cu—Kα ray having an X-ray wavelength of 1.5418 Å gives diffraction peaks at least at diffraction angles (2θ) of 9.5±0.3, 10.1±0.3, 12.8±0.3, 19.5±0.3, 20.4±0.3, 24.3±0.3 and 30.7±0.4.

Preferably, the ferroaluminophosphate is any of the following: (a) Its peak intensity appearing at a diffraction angle (2θ) of 10.1±0.3 is at least 10% of the peak intensity appearing at a diffraction angle (2θ) of 9.5±0.3; (b) its peak intensity appearing at a diffraction angle (2θ) of 19.5±0.3 is at least 10% of the peak intensity appearing at a diffraction angle (2θ) of 9.5±0.3; (c) Fe, Al and P form its framework structure in a molar ratio of the following formulae (1) to (3):

$$0.001 \leq x \leq 0.3 \qquad (1)$$

wherein x indicates a molar ratio of Fe to the total of Fe, Al and P;

$$0.2 \leq y \leq 0.6 \qquad (2)$$

wherein y indicates a molar ratio of Al to the total of Fe, Al and P;

$$0.3 \leq z \leq 0.6 \qquad (3)$$

wherein z indicates a molar ratio of P to the total of Fe, Al and P;

(d) it is used for a steam adsorbent; (e) the framework density of the ferroaluminophosphate that is used for a steam adsorbent falls between 10 T/nm$^3$ and 16 T/nm$^3$, and, on the adsorption isotherm of the ferroaluminophosphate measured at 55° C., the adsorbate adsorption amount by the adsorbent is at most 0.12 g/g at a relative vapor pressure of 0.02 and is at least 0.13 g/g at a relative vapor pressure of 0.1, and the adsorbent has a relative vapor pressure region to give an adsorbate adsorption amount change of at least 0.08 g/g when the relative vapor pressure thereof has changed by 0.05 in a range of the relative vapor pressure thereof of from 0.02 to 0.1.

(4) One preferred method for producing the ferroaluminophosphate of the invention that solves the above-mentioned problems comprises calcining a ferroaluminophosphate that gives, in its powdery X-ray diffractiometry with a Cu—Kα ray having an X-ray wavelength of 1.5418 Å, diffraction peaks at least at diffraction angles (2θ) of 9.5±0.3, 13.1±0.3, 16.0±0.3, 20.7±0.3, 26.0±0.3 and 30.8±0.4, in an oxygen-containing gas. According to the method of the invention, a ferroaluminophosphate that gives specific X-ray peaks is calcined in an oxygen-containing gas, and it efficiently gives a ferroaluminophosphate of which the structure is tough and is hardly broken and which is therefore favorable for adsorbent for regenerator systems.

BRIEF DESCRIPTION OF THE DRAWINGS

By way of example and to make the description more clear, reference is made to the accompanying drawing in which.

In the figures, reference numbers and signs have the following respective meanings.

| | |
|---|---|
| 1: | Engine |
| 2: | Radiator |
| 3: | Pump |
| 4: | Adsorption Chamber |
| 5: | Adsorbent |
| 6: | Adsorption Core |
| 6a: | Waste Heat Supply Unit |
| 6b: | Adsorption Heat Supply Unit |
| 6c: | Cooling Unit |
| 7: | Adsorbent Cooling Unit |
| 7a: | Radiator for Heat Accumulation |
| 7b: | Switch Valve |
| 7c: | Pump |
| 8: | Vapor Compression-Type Refrigerator |
| 8a: | Compressor |
| 8b: | Condenser |
| 8c: | Expansion Valve |
| 8d: | Vaporizer |
| 9: | Condensation Core |
| 10: | Liquid Reservoir Chamber |
| 11: | Pathway |
| 12: | Valve |
| 12a: | First Valve |
| 12b: | Second Valve |
| 13: | Switch Valve |

DETAILED DESCRIPTION OF THE INVENTION

The adsorbent for heat utilization systems and the heat utilization system with the adsorbent of the invention are described hereinunder for their embodiments, the adsorbent for regenerator systems and the regenerator system with the adsorbent, with reference to the drawings attached hereto. In addition, the ferroaluminophosphate of the invention and a method for producing it are also described.

A regenerator system includes different types of (1) a regenerator system in which waste heat is supplied to an adsorbent therein to desorb the adsorbate from it, and the heat thus generated when the adsorbent again adsorbs an adsorbate is supplied to devices to be warmed up (in this case, hot heat is accumulated in the system), (2) a regenerator system in which waste heat is supplied to an adsorbent therein to desorb the adsorbate from it, and the latent heat of vaporization generated while the adsorbate vaporizes and is adsorbed to the adsorbent, is fed to the cooling medium that circulates inside a refrigerator for cooling (in this case, cold heat is accumulated in the system), and (3) a regenerator system that comprises a combination of (1) and (2) (in this case, hot heat and cold heat are accumulated). The regenerator systems of those types is equipped with an adsorption-type regenerator device that essentially comprises an adsorption and desorption zone and a water reservoir zone serving for both vaporization and vapor condensation.

(Constitution of Regenerator System for Vehicles)

The regenerator system of the invention, which comprises a combination of above (1) and (2) of utilizing both the heat of adsorption and the latent heat of vaporization, is described more concretely with reference to its embodiment applied to vehicles with an internal combustion engine fitted therein.

Figure 1:
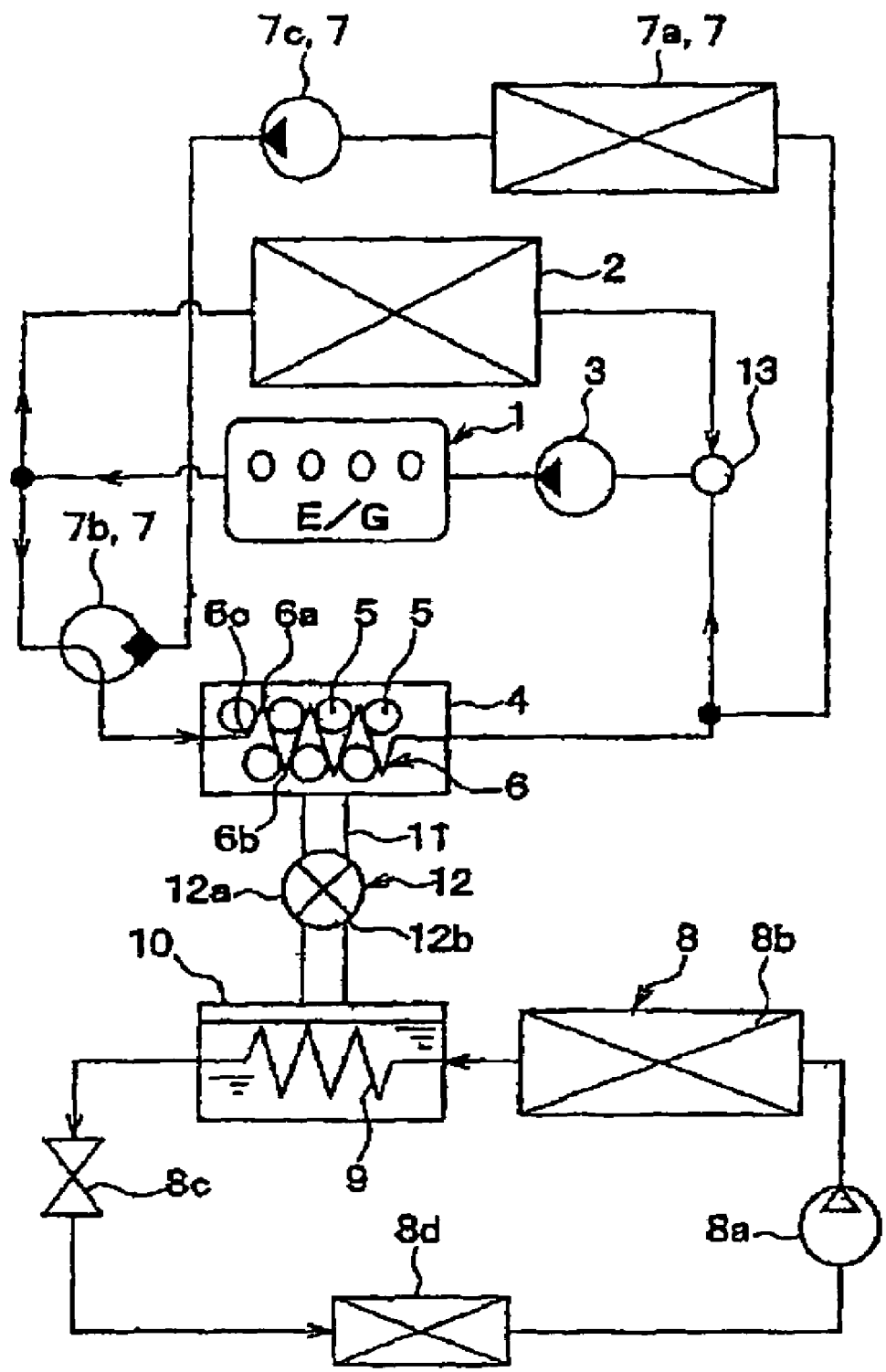
FIG. 1 is a schematic view showing one embodiment of the regenerator system of the invention applied to a vehicle.

FIG. 1 is a schematic view of a regenerator system for vehicles. In this, the engine 1 is an internal combustion engine that serves as a driving source; the radiator 2 is a cooling unit to cool the cooling water that has circulated inside the engine 1, through heat exchange with fresh air; the pump 3 is a unit that gets motive power from the engine 1 to circulate the cooling water.

The adsorption chamber 4 houses an adsorption core 6 with an adsorbent 5 adhering on its surface. In this, the adsorbent 5 desorbs the adsorbate from it when heated. When it adsorbs the adsorbate, the adsorbent 5 generates heat. In this embodiment illustrated herein, the adsorbate is water, and the adsorbent is that for regenerator systems of the invention mentioned above. When it adsorbs an adsorbate, in general, the adsorbent 5 generates heat of adsorption not smaller than the heat of condensation of the adsorbate. In addition, the adsorbate adsorption amount by the adsorbent depends on the ambient temperature around the adsorbent, or that is, the amount of the adsorbate which the adsorbent may adsorb varies depending on the temperature of the adsorbent 5 even at the same relative pressure of the adsorbate.

Cooling water circulates inside the adsorption core 6 for heat exchange between the cooling water and the adsorbent 5. In case where the temperature of the cooling water that runs inside the adsorption core 6 is higher than the temperature of the adsorbent 5, then the adsorption core 6 functions as a waste heat supply unit 6a that gives waste heat of the engine 1 to the adsorbent 5; but when the temperature of the cooling water that runs inside it is lower than the temperature of the adsorbent 5, then the adsorption core 6 functions as an adsorption heat supply unit 6b that gives heat to the cooling water, or that is, to the engine 1. In an auxiliary cooling priority mode that will be mentioned hereinunder, the adsorption core 6 is a heat exchanger that functions as a cooling unit 6c to cool the adsorbent 5.

The regenerative radiator 7a is a heat release unit to cool the adsorbent 5 through heat exchange between the cooling water that runs inside the adsorption core 6 and fresh air. The switch valve 7b is a valve for switching the flow of the cooling water from the regenerative radiator 7a to the adsorption core 6 with the flow of the cooling water from the engine 2 to the adsorption core 6.

The pump 7c is an electromotive pump for circulating cooling water through the regenerative radiator 7a and the adsorption core 6. The regenerative radiator 7a, the switch valve 7b, the pump 7c, and the heat exchanger with the adsorption core 6 therein constitute an adsorbent cooling system 7 to cool the adsorbent 5.

The vapor compression-type refrigerator 8 is to cool air that blows into the chamber. As well known, this comprises a compressor 8a, a condenser 5b, an expansion valve 8c and an evaporator 8d. The high-temperature and high-pressure coolant that is jetted out from the compressor 8a is cooled by air and condensed in the condenser 8b; while the low-temperature and low-pressure coolant that has expanded under reduced pressure via the expansion valve 8c absorbs heat from the air blowing into the chamber of the evaporator 8, and it thus vaporizes therein.

In the coolant circuit in the vapor compression-type refrigerator 8, a condensation core 9 serving as a coolant-adsorbate heat exchanger is provided between the condenser 8b and the expansion valve 8c, and the condensation core 9 is housed in the liquid reservoir chamber 10 that communicated with the adsorption chamber 4, and acts for heat exchange between the coolant and the adsorbate. The liquid reservoir chamber 10 is essentially for a chamber to house therein the adsorbate that has been cooled and condensed by the condensation core 9. The communicating pathway 11 to connect the liquid reservoir chamber 10 and the adsorption chamber 4 is equipped with a switch valve 12 that opens and shuts the communicating pathway 11. The valve 12 has both a function as a first valve 12a of controlling the introduction or shutoff of the vapor-phase adsorbate having been desorbed by the adsorbent 5 to the condensation core 9, and a function as a second valve 12b for controlling the flow of the vapor-phase adsorbate from the liquid reservoir chamber 10 to the adsorption chamber 4.

The switch valve 13 is for switching the flow of the cooling water from the engine 1 both to the adsorption core 6 and the radiator 2 or to the radiator 2 alone. In FIG. 1, shown is neither a bypass circuit through which the cooling water that flows out from the engine 1 to run into the radiator 2 detours through the radiator 2 to return to the engine 1, nor a flow control valve such as a thermostat for controlling the quantity of the cooling water to be led to the bypass circuit.

(Outline of Operation of Regenerator System for Vehicles)

Figure 2:
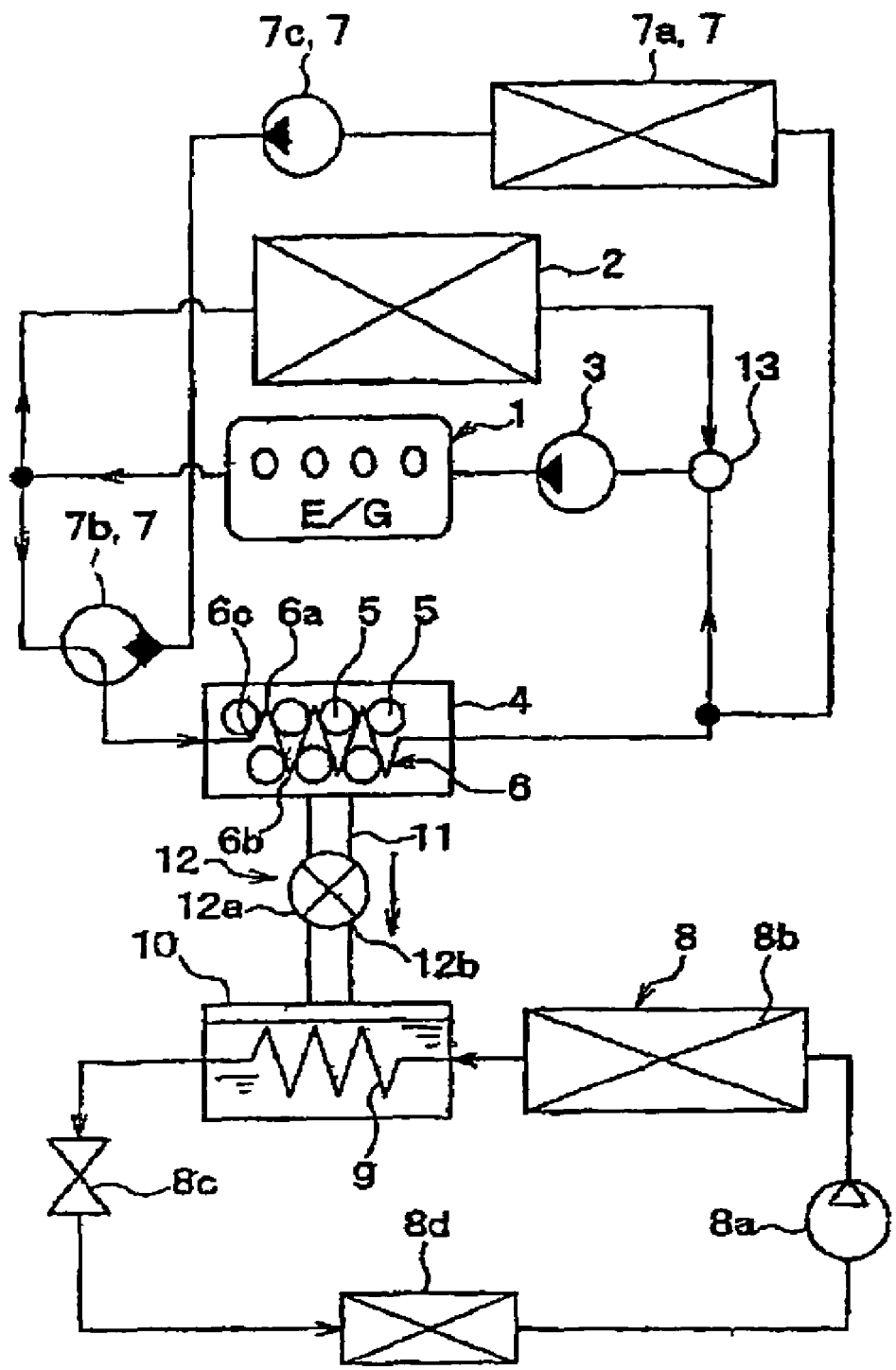
FIG. 2 is a schematic view for explaining the heat accumulation mode of the regenerator system for vehicles.
Figure 3:
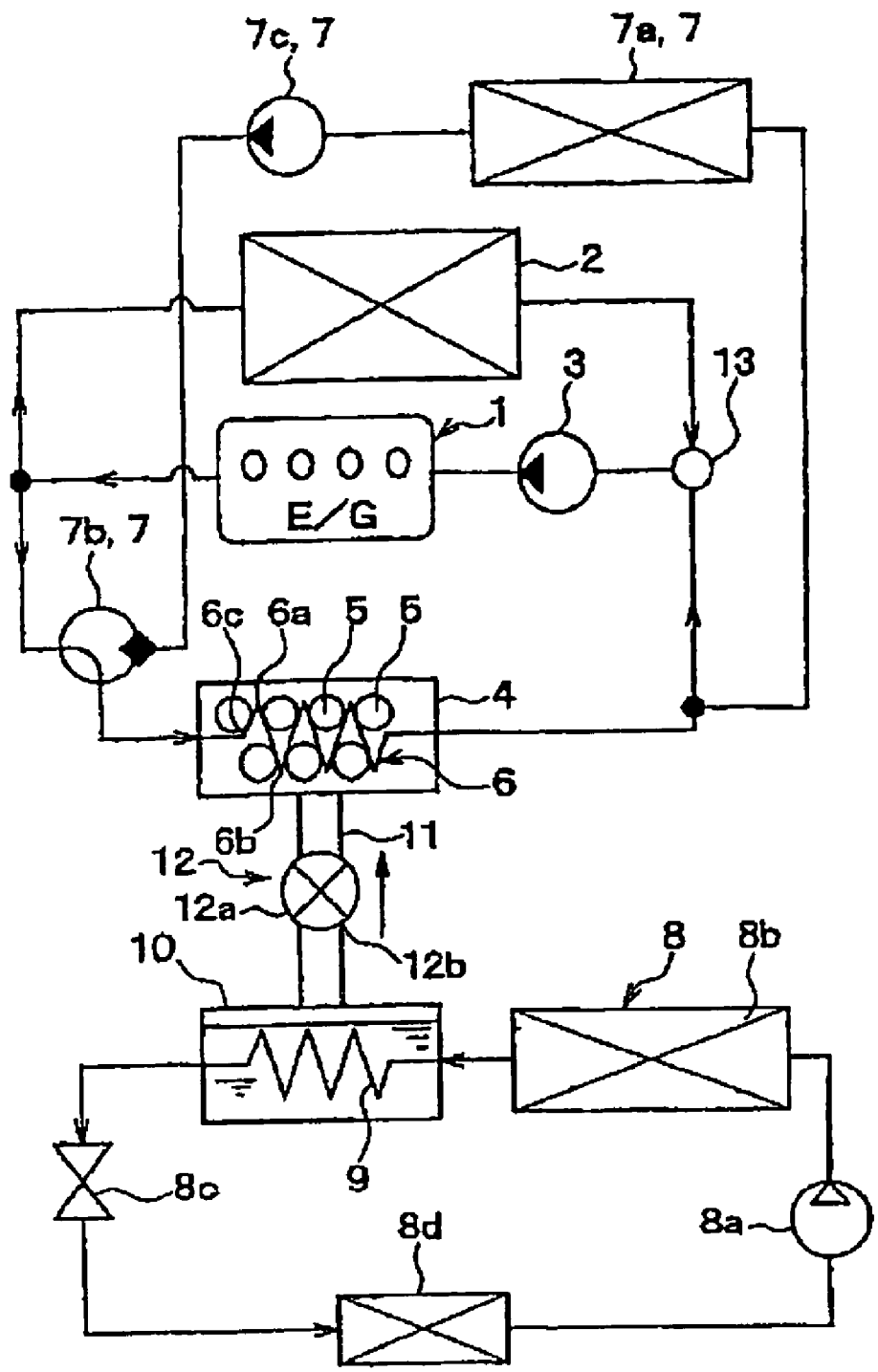
FIG. 3 is a schematic view for explaining the warming-up and auxiliary cooling mode of the regenerator system for vehicles.
Figure 4:
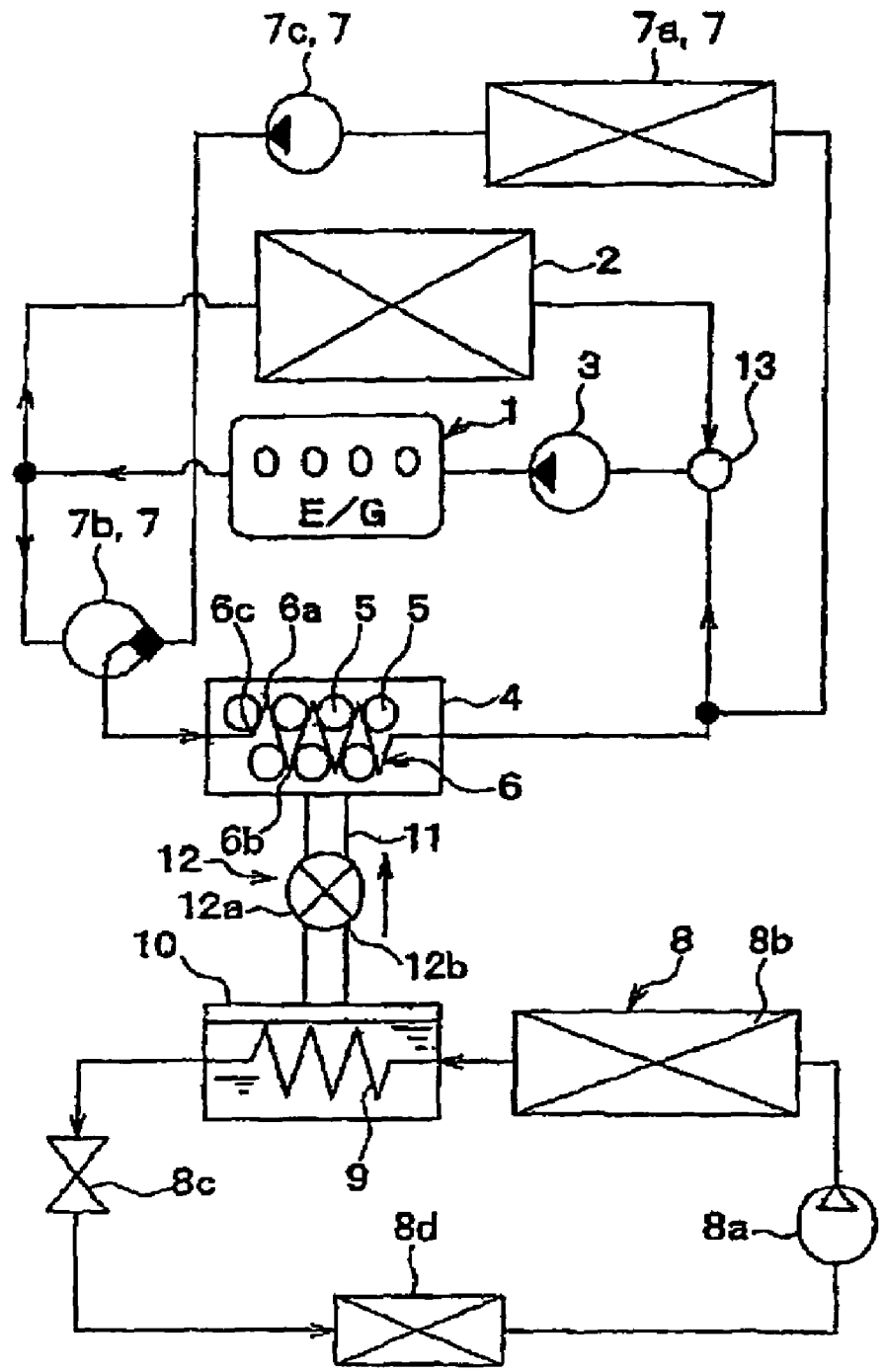
FIG. 4 is a schematic view for explaining the auxiliary cooling priority mode of the regenerator system for vehicles.

Next described are the characteristic operation of this embodiment and the advantages thereof with reference to FIG. 2 to FIG. 4.

(Heat Accumulation Mode) (See FIG. 2.)

This mode starts when the temperature of the cooling water from the engine 1 has reached a predetermined level (for example, at 80° C. to 90° C.) or higher at which it may be considered that the warming up of the engine 1 has finished.

Concretely, while the engine 1 and the vapor compression-type refrigerator 8 are driven, the valve 12 is kept opened for a predetermined period of time, and after the predetermined period of time has passed, the valve 12 is closed. Accordingly, high-temperature cooling water flows in the adsorption core 6, and therefore the adsorbent 5 absorbs the waste heat from the engine 1 via the cooling water, and desorbs and releases the adsorbate as a vapor thereof.

In this stage, the atmospheric temperature in the adsorption chamber 4 is on the same level as that of the temperature of the cooling water (for example, at 80° C. to 90° C. or so), and the atmospheric temperature in the liquid reservoir chamber 10 is on the same level as that of the temperature of the adsorbate (for example, at 40° C. to 60° C.). In general, the atmospheric temperature in the liquid reservoir chamber 10 is lower than that in the adsorption chamber 4, and the adsorbate desorbed and released from the adsorbent 5 flows into the liquid reservoir chamber 10 and cooled and condensed by the condensation core 9 therein to be a liquid-phase adsorbate to remain in the liquid reservoir chamber 10. The heat imparted to the coolant via the condensation core 9 is finally released out in air from the condenser 8b.

In this stage, the time for which the valve 12 is kept opened is a time necessary for desorption and release of all the adsorbate adsorbed by the adsorbate 5 at the temperature of the cooling water that flows out of the engine 1 and capable of being desorbed under the condition, and it shall be suitably determined depending on the adsorption capacity of the adsorbent 5.

(Warming-Up and Auxiliary Cooling Mode) (See FIG. 3.)

This mode starts in cold when the temperature of the cooling water from the engine 1 has reached lower than a predetermined level (for example, 80° C. to 90° C.) and when the temperature of the engine 1 has therefore lowered, in particular, when the engine 1 is to start.

Concretely, the valve 12 is opened while the engine 1 is driven. Accordingly, since low-temperature cooling water flows into the adsorption core 6, the adsorbent 5 adsorbs the vapor-phase adsorbate in the adsorption chamber 4 and the cooling water that flows out of the adsorption core 6 is thus heated by the heat of adsorption generated in this stage. Therefore, since the temperature of the cooling water to return to the engine 1 rises, and the warming-up of the engine 1 is thereby promoted.

In this stage, when the adsorbent 5 adsorbs the vapor-phase adsorbate in the adsorption chamber 4, then the pressure inside the adsorption chamber 4 becomes lower than that inside the liquid reservoir chamber 10. If the vapor compression-type refrigerator 8 is driven in that condition, then the atmospheric temperature in the liquid reservoir chamber 10 may be on the same level as the coolant temperature (for example, at 40° C. to 60° C. or so), and the atmospheric temperature inside the adsorption chamber 4 is on the same level as the open air temperature (for example, at 25° C. or so). In that condition, therefore, the liquid-phase adsorbate inside the liquid reservoir chamber 10 still absorbs the heat from the coolant via the condensation core 9 and keeps vaporizing. Accordingly, since the coolant on the side of the condenser 8b, or that is, the high-pressure side coolant in the vapor compression-type refrigerator 8 is cooled, the pressure of the high-pressure side coolant can be lowered as compared with that in the vapor compression-type refrigerator 8 not having the condensation core 9 therein. In addition, since the enthalpy (degree of dryness) of the coolant at the inlet of the evaporator 8d is lowered, the cooling capacity can be increased. Moreover, since the jet-out pressure from the compressor 8a is lowered, the consumption energy of the compressor 8a, or that is, the load to the engine 1 may be reduced, and the power necessary for the vapor compression-type refrigerator 8 may be reduced.

As described hereinabove, in this embodiment, the waste heat from the engine 1 is accumulated as the latent heat of vaporization of the adsorbate on the basis of the adsorption capability of the adsorbent 5, and when the cooling water temperature is low in the operation of warming up the engine, then the heat of adsorption generated during adsorption is imparted to the engine to promote the warming-up thereof while improving the cooling-down performance thereof, and the consumption energy of the vapor compression-type refrigerator 8 may be thereby reduced.

After the warming-up operation has finished, the valve 12 may be kept still opened. In that manner, for example, the number of revolutions of the engine 1 and the running air flow thereof may be lowered while idling is stopped, and, as a result, the thermal load to the vapor compression-type refrigerator 8, or that is, the cooling capability of the condenser 8b may be reduced and the load to the engine 1 could be thereby reduced to lower the cooling water temperature. Accordingly, the system may be automatically changed to a warming-up and auxiliary cooling mode, and the cooling water temperature is prevented from being too much lowered while the consumption power of the vapor compression-type refrigerator 8. On the other hand, while the engine 1 is driven, the load to the running engine increases and the cooling water temperature is therefore elevated, and as a result, the system is automatically changed to a heat accumulation mode. Accordingly, even though any specific switching unit is not provided therein, the system may be automatically switched from a warming-up and auxiliary cooling mode to a heat accumulation mode and vice versa.

(Auxiliary Cooling Priority Mode) (See FIG. 4.)

This mode starts cooling assistance when the temperature of the cooling water from the engine 1 has reached higher than a predetermined level (for example, 80° C. to 90° C.) at which it may be considered that the warming-up operation of the engine 1 has been finished.

Concretely, while the valve 12 is kept opened, cooling water is circulated between the heat accumulation radiator 7a and the adsorption core 6. Accordingly, since the atmospheric temperature inside the adsorption chamber 4 can be kept on the same level as that of the open air temperature (for example, at around 25° C.), the liquid-phase adsorbate in the liquid reservoir chamber 10 absorbs heat from the coolant via the condensation core 9 and keeps vaporizing. As a result, since the coolant on the side of the condenser 8b, or that is, the high-pressure side coolant in the vapor compression-type refrigerator 8 is cooled, the pressure of the high-pressure side coolant can be lowered as compared with that in the vapor compression-type refrigerator 8 not having the condensation core 9 therein.

As described hereinabove, in this embodiment, the waste heat from the engine 1 is accumulated as the latent heat of vaporization of the adsorbate on the basis of the adsorption capability of the adsorbent 5, and when the cooling water temperature is low in the operation of warming up the engine, then the heat of adsorption generated during adsorption is imparted to the engine to promote the warming-up thereof while improving the cooling-down performance thereof, and the consumption energy of the vapor compression-type refrigerator 8 may be thereby reduced. In addition, effectively utilizing the adsorption capability of the adsorbent 5, there is provided a regenerator system of high practical value both for hot storage and for cold storage.

(Other Embodiments)

The above-mentioned embodiments are those for both hot storage and cold storage in one adsorption unit, to which, however, the invention is not limited. The regenerator system of the invention may be exclusively for hot storage only for promoting the warming-up of the engine 1, or exclusively for cold storage only for assisting the air-conditioning with the vapor compression-type refrigerator 8.

In the embodiments illustrated above, the condensation core 9 is housed in the liquid reservoir chamber 10, to which, however, the invention is not limited. For example, the liquid reservoir chamber 10 may be provided individually and separately from the condensation core 9 not housing it therein. In this case, however, since one and the same valve 12 could not act both for the first valve 12a and the second valve 12b, the first valve 12a and the second valve 12b must be provided independently.

In the above-mentioned embodiments, the heat exchanger for the waste heat supply unit 6a, the heat exchanger for the adsorption heat supply unit 6b, and the heat exchanger for the cooling part 6c of the adsorbent cooling unit 7 constitute one adsorption core 6, to which, however, the invention is not limited. If desired, the heat exchangers for these units 6a to 6b may be provided independently.

In the above-mentioned embodiments, water is used for the adsorbate, to which, however, the invention is not limited. Apart from it, alcohols may also be used for the adsorbate.

In the warming-up and auxiliary cooling mode of the above-mentioned embodiments, the vapor compression-type refrigerator 8, or that is, the compressor 8a is driven, to which, however, the invention is not limited. As the case may be, the vapor compression-type refrigerator 8 may be stopped in the warming-up and auxiliary cooling mode.

In the above-mentioned embodiments, the vapor compression-type refrigerator 8 is used, to which, however, the invention is not limited. Apart from it, any other adsorption-type refrigerator or ejector cycle may also be used for the refrigerator.

In the above-mentioned embodiments, the engine 1 is used for the device to be warmed up, to which, however, the invention is not limited. In electric automobiles, for example, motors and inverter circuits are the devices to be warmed up.

In the above-mentioned embodiments, the waste heat from the engine 1, or that is, the heat obtained via a medium of engine-cooling water is used, to which, however, the invention is not limited. Apart from it, the exhaust gas from the engine 1 may be used as the source of waste heat herein.

In the above-mentioned embodiments, the condensation core 9 is provided on the side downstream the condenser 8b, to which, however, the invention is not limited. Apart from it, the condensation core 9 may be in any site of the vapor compression-type refrigerator 8. Preferably, however, it is in the site where the temperature difference between the coolant and the adsorbate is large.

(Description of Operation Principle of Adsorption-type Regenerator System)

The operation principle of the adsorption-type regenerator system that is designed as in the above and is driven in the manner as above is described.

An adsorption-type regenerator system is described, in which the heat of adsorption generated by the adsorbate adsorbed by an adsorbent is fed to a device to be warmed up in a vehicle, while the latent heat of vaporization of the adsorbate also generated at the same time is fed to a refrigerator to cool the air to be blown into the room of the vehicle to cool it.

Of the system that comprises an adsorption and desorption zone with an adsorbate and an adsorbent to adsorb the adsorbate therein, and a vaporization-condensation zone where the adsorbate is vaporized and condensed in a heat exchanger for heat exchange between the coolant to circulate in a refrigerator with the adsorbate, one example is now discussed herein in which the adsorbate is water and which is for promoting the warming-up operation of a device in a vehicle, such as typically an engine therein.

The working range of the adsorbent is referred to. At the engine start, or that is, at the cold start of engine, the adsorbent adsorbs water, and the heat of adsorption thus generated is supplied to the engine to warm up it. In this stage, it is desirable that the temperature of the adsorbent is elevated from the open air temperature (for example, 25° C.) up to about 55° C. Our investigations have confirmed that the water temperature in the vaporization-condensation zone is about 13° C. Accordingly, the equilibrium relative vapor pressure on the adsorption side is about 0.10. When water is desorbed from the adsorbent and regenerated during driving, the adsorbent temperature may be on the same level as that of the engine cooling water temperature (for example, 100° C.), and the water temperature in the vaporization-condensation zone is about 20° C. Accordingly, in stage, the equilibrium relative vapor pressure on the desorption side is about 0.02. From these, it is desirable that the adsorbent for the system has a larger difference $\Delta C$ between the adsorption at 55° C. and under a relative vapor pressure of 0.10, and the adsorption at 100° C. and under a relative vapor pressure of 0.02.

Our investigations have confirmed that the heat accumulation necessary for promoted warming-up in the adsorption-type regenerator system is at least 180 kJ. In addition, it is believed that the exclusive device capacity will be at most 4 liters in view of the inner space of the engine room in various vehicles.

Now the weight of the adsorbent that may be charged in the capacity of at most 4 liters is taken into consideration. The parts to be built in the device are an adsorption core, the vaporization-condensation core, and valves, and these parts must be integrally assembled to be in the device having an overall capacity of at most 4 liters. Our investigations in this connection have confirmed that the exclusive capacity that is acceptable for the adsorption core is around 2.4 liters. The fill factor of the adsorbent in the adsorption core and the bulk density of the adsorbent therein are generally about 40% and about 0.6 kg/liter, respectively. Therefore, the weight of the adsorbent that may be filled in the device may be about 0.6 kg.

Next described are the characteristics necessary for adsorbents. The heat of adsorption, Q, that is generated by an adsorbent adsorbed by an adsorbent is given by the following formula (A):

$$Q = \Delta H \times \Delta C \times W \quad (A)$$

wherein $\Delta H$ indicates the heat of adsorption per the unit weight of an adsorbent; $\Delta C$ indicates the adsorption amount difference per the adsorbent unit weight between the adsorption and the desorption; and W indicates the weight of the adsorbent.

When W is 0.6 kg as above, then $\Delta H \times \Delta C$ must be at least 300 kJ/kg. In general, the heat of condensation of water is around 2500 kJ/kg. Therefore, when $\Delta H$ of water is comparable to it, then $\Delta C$ thereof must be at least about 0.12 kg/kg. On the other hand, when $\Delta H$ is about 1.5 times the heat of condensation of water, then the necessary $\Delta C$ shall be about 0.08 kg/kg or so.

From the above, when the adsorption characteristics necessary for the adsorbent to be used in the adsorption-type regenerator system is expressed within the range on the water vapor adsorption isotherm curve at 55° C., then they may be as follows:

The differential heat of adsorption of the adsorbent is larger than the heat of adsorption of water, and is at least 55 kJ/mol; the adsorbate adsorption amount by the adsorbent is at most 0.12 g/g at a relative vapor pressure of 0.02 and is at least 0.13 g/g at a relative vapor pressure of 0.1; and the adsorbent has a relative vapor pressure region to give an adsorbate adsorption amount change of at least 0.08 g/g when the relative vapor pressure thereof has changed by 0.05 in a range of the relative vapor pressure thereof of from 0.02 to 0.1. Preferably, the adsorbate adsorption amount by the adsorbent is at most 0.1 g/g at a relative vapor pressure of 0.02 and is at least 0.15 g/g at a relative vapor pressure of 0.1. More preferably, the adsorbate adsorption amount by the adsorbent is at most 0.05 g/g at a relative vapor pressure of 0.02 and is at least 0.2 g/g at a relative vapor pressure of 0.1, and the adsorbent has a relative vapor pressure region to give an adsorbate adsorption amount change of at least 0.12 g/g (even more preferably, at least 0.15 g/g) when the relative vapor pressure thereof has changed by 0.05 in a range of the relative vapor pressure thereof of from 0.02 to 0.1.

Even more preferably, the adsorbate adsorption amount by the adsorbent is at most 0.1 g/g at a relative vapor pressure of 0.02 and is at least 0.15 g/g at a relative vapor pressure of 0.07, and the adsorbent has a relative vapor pressure region to give an adsorbate adsorption amount change of at least 0.08 g/g when the relative vapor pressure thereof has changed by 0.05 in a range of the relative vapor pressure thereof of from 0.02 to 0.07.

Most preferably, the adsorbate adsorption amount by the adsorbent is at most 0.05 g/g at a relative vapor pressure of 0.02 and is at least 0.2 g/g at a relative vapor pressure of 0.08, and the adsorbent has a relative vapor pressure region to give an adsorbate adsorption amount change of at least 0.15 g/g when the relative vapor pressure thereof has changed by 0.02 in a range of the relative vapor pressure thereof of from 0.02 to 0.08.

One example of the regenerator system of the invention that is equipped with an adsorption-type regenerator device is described hereinabove with reference to its application to vehicles, which, however, is not limitative. Satisfying the above-mentioned characteristics, it is needless to say that the system may be well applicable to any and every other use for stationary appliances.

In the adsorption-type regenerator system of the invention, the capability of the adsorbent to adsorb and desorb an adsorbate is utilized for the driving source. In the adsorption-type regenerator system, the adsorbate may be any of water, ethanol or acetone, but water is the best in view of the safety, the cost and the latent heat of vaporization thereof. The adsorbate is adsorbed by the adsorbent as its vapor, and the adsorbent is preferably made of a material in which the adsorption amount change within a narrow vapor pressure range is large. The advantages of the adsorbent in which the adsorption amount change within a narrow vapor pressure range is large are that the amount of the adsorbent necessary for attaining the same adsorption amount under the same condition may be reduced and, even when the temperature difference between the cooling source and the heating source is small, the adsorption-type regenerator system could be still driven.

The adsorbent to be used in the regenerator system equipped with the adsorption-type regenerator device of the type may be any one usable in moisture removers that directly adsorb water vapor in air, desiccant air-conditioning devices, moisture-controlling construction materials and others, and may also be an adsorbent of such a type that is used in a vacuum environment containing water vapor alone.

(Adsorbent for Regenerator System)

The adsorbent for regenerator systems of the invention preferably satisfies the following requirements in order that the systems with it may be effectively driven. On the adsorption isotherm thereof measured at 55° C., <1> the adsorbate adsorption amount by the adsorbent is at most 0.12 g/g, more preferably at most 0.1 g/g at a relative vapor pressure of 0.02, <2> the adsorbate adsorption amount by it is at least 0.13 g/g, more preferably at least 0.15 g/g at a relative vapor pressure of 0.1, and <3> the adsorbent has a relative vapor pressure region to give an adsorbate adsorption amount change of at least 0.08 g/g when the relative vapor pressure thereof has changed by 0.05 in a range of the relative vapor pressure thereof of from 0.02 to 0.1. The adsorbent of the type is suitable to regenerator systems to be mounted on automobiles with which the problems are that they generate much waste heat and their fuel efficiency is further lowered when an air conditioner is driven therein.

The adsorption-type regenerator device to be in the regenerator system of the invention comprises an adsorption and desorption zone (where the adsorbent adsorbs and desorbs an adsorbate), and a water reservoir zone that serves both as an vaporization zone (which is connected to the adsorption and desorption zone and in which the adsorbate is vaporized) and a condensation zone (which is connected to the adsorption and desorption zone and in which the adsorbate is condensed), as so mentioned hereinabove.

One embodiment of mounting a regenerator system with the adsorption-type regenerator device having the constitution as above, on an automobile is described in the following, with reference to the relationship between the individual parts of the adsorption-type regenerator device and the above-mentioned characteristics <1> to <3>.

Characteristic <1>—Desorption Capability:

Regarding the desorption capability thereof, it is desirable that the adsorbent of the invention has an adsorbate adsorption amount of at most 0.12 g/g, more preferably at most 0.1 g/g at a relative vapor pressure of 0.02. For example, in automobiles, since the adsorption and desorption zone is heated at around 90° C. with hot water heated by waste heat to approximately 90° C. or so while the adsorbate is desorbed therein and since the condensation part is cooled to around 10° C. by the coolant circulating inside the cooling unit and having a temperature of around 10° C., the relative vapor pressure between them will be about 0.02. Therefore, the adsorbent of the invention that has an adsorbate adsorption amount of at most 0.12 g/g at such a relative vapor pressure of 0.02 exhibits a good desorption capability at the relative vapor pressure. In case where the temperature in the adsorption and desorption zone is low, at most 90° C., for example, at 60 to 85° C. or so, or in case where the temperature in the condensation zone is higher than 10° C., for example, at 15 to 30° C. or so, the relative vapor pressure between them may be larger than 0.02. Accordingly, since the adsorbent must act for good desorption at such a high relative temperature higher than 0.02, the adsorption amount of the adsorbent under the condition of a relative vapor pressure of 0.02 is preferably lower, for example, at most 0.05 g/g. Though not specifically defined, the lowermost limit of the adsorption amount is preferably 0 or nearer to 0.

Regarding the adsorption capability thereof, it is desirable that the adsorbent of the invention has an adsorbate adsorption amount of at least 0.13 g/g, more preferably at least 0.15 g/g at a relative vapor pressure of 0.1. In automobiles and others, the adsorption and desorption zone is cooled to approximately 45 to 60° C. or so by cold water that is cooled by a radiator while the vaporization zone is kept at approximately 10° C. or so by a heat exchanger, and the relative vapor pressure between them will be therefore about 0.10. Accordingly, the adsorbent of the invention of which the adsorbate absorption amount at a relative vapor pressure of 0.10 is at least 0.13 g/g exhibit an excellent adsorption capability at the relative vapor pressure. More preferably, the adsorbent adsorption amount of the adsorbent of the invention is at least 0.15 g/g, even more preferably at least 0.20 g/g at a relative vapor pressure of 0.10. Still more preferably, the adsorption capability of the adsorbent is such that its adsorbate adsorption amount is at least 0.2 g/g at a further lower relative vapor pressure (for example, at 0.08). The adsorbent of the preferred type enables relatively efficient and good adsorption of adsorbate even at a relatively high-temperature cooling condition of approximately from 45 to 60° C. at which the adsorbent is cooled with cooling water in a radiator in automobiles. Though not specifically defined, the uppermost limit of the adsorption amount may be generally approximately 0.30 g/g.

Characteristic <3>—Adsorption Change:

Preferably, the adsorbate adsorption amount change in the adsorbent of the invention is at least 0.08 g/g when the relative vapor pressure of the adsorbent has changed by 0.05 in a range of the relative vapor pressure thereof of from 0.02 to 0.1. In automobiles and others, the difference between the relative vapor pressure of the adsorbent for desorption, 0.02, and the relative vapor pressure thereof for adsorption, 0.1 is small, and the adsorption change within the range is large (concretely, the adsorbent adsorption amount change is at least 0.08 g/g when the relative vapor pressure has changed by 0.05 within the range), as so mentioned hereinabove, and therefore, the sum total amount of the adsorbent necessary for attaining the same level of adsorption amount/desorption amount under the same condition may be reduced.

One advantage of the adsorbent of the invention that satisfies the above-mentioned adsorption-desorption characteristic requirements <1> to <3> is that the adsorption process with it starts under a lower relative vapor pressure condition and the desorption process with it starts under a higher relative vapor pressure condition, as compared with those with any other ordinary adsorbents; and another advantage thereof is that its adsorption amount varies even with only a slight relative humidity change around it. Accordingly, the adsorbent of the invention is favorable for regenerator systems to be mounted on automobiles that give much waste heat and have a problem in that the fuel efficiency is further lowered when the air conditioner fitted thereto is driven.

The adsorbent for regenerator systems of the invention is a zeolite, of which the framework density in terms of the numerical value shown in IZA's ATLAS OF ZEOLITE FRAMEWORK TYPES Fifth Revised Edition 2001, is preferably from 10 T/nm³ (=1000 Å³) to 18.0 T/nm³, more preferably from 10.0 T/nm³ to 16.0 T/nm³. Having a framework density falling within the range, the adsorbent has the preferred adsorption-desorption characteristics mentioned above. The existence of an adsorbent having a framework density of smaller than 10 T/nm³ has not been confirmed, and it is considered that the structure of the adsorbent of the type will be unstable. On the other hand, adsorbents having a framework density of larger than 18.0 T/nm³ is unfavorable in point of its adsorption amount.

Zeolite for use herein may be natural zeolite or artificial zeolite. For example, the artificial zeolite includes crystalline silicates and crystalline aluminophosphates defined by the International Zeolite Association (IZA). The value of framework density of zeolite is determined by the structure thereof, and the structure of zeolite includes, for example, AFG, AEI, AFR, AFS, AFT, AEX, AFY, AHT, *BEA, BOG, CHA, DFO, EAB, ERI, EMT, FAU, GIS, GME, KFI, LEV, LIO, LOS, LTA, LTN, MEI, MER, OFF, PAU, PHI, RHO, THO and VFI, represented by IZA's codes. In view of the adsorption-desorption capabilities thereof, more preferred are AEI, AFX, GIS, CHA, VFI, AFS, LTA, FAU and AFY; and even more preferred is CHA.

The framework density means a number of the atoms except oxygen (T atoms) that form the framework per nm³ (=1000 Å³) of zeolite. Therefore, the framework density has a correlation with the pore volume of zeolite. In general, zeolite having a smaller framework density is favorable since it has a larger pore volume and therefore has a larger adsorption capacity. Naturally, even zeolite that could not be synthesized at present should be favorable for the adsorbent for regenerator systems of the invention after it could be synthesized and its framework density could fall within the range as above.

The zeolite structure may be determined through XRD (X-ray diffraction), and the framework structure of the thus-analyzed zeolite may be measured and evaluated from its structure. ATLAS OF ZEOLITE FRAMEWORK TYPES Fifth Revised Edition 2001, ELSEVIER discloses the relationship between the structure of zeolite and the framework density thereof.

(Aluminophosphate)

Of the zeolite of those types, crystalline aluminophosphates are more preferred for the adsorbent for regenerator systems of the invention. Crystalline aluminophosphates contain aluminium (Al) and phosphorus (P) in the framework structure thereof, and include crystalline metalloaluminophosphates in which a part of Al and P are substituted with any other hetero atom. The hetero atom for these is for further improving the hydrophilicity of zeolite, and may be one or more of silicon, lithium, magnesium, titanium, zirconium, vanadium, chromium, manganese, iron, cobalt, nickel, palladium, copper, zinc, gallium, germanium, arsenic, tin, calcium, boron and the like. In the invention, especially preferred are iron (Fe) and silicon (Si).

Preferably, the aluminophosphates for use herein have a framework structure with a hetero atom, Al and P in a molar ratio of the following formulae (a) to (c):

$$0.001 \leq x \leq 0.4 \tag{a}$$

wherein x indicates a molar ratio of the hetero atom to the total of the hetero atom, Al and P;

$$0.2 \leq y \leq 0.6 \tag{b}$$

wherein y indicates a molar ratio of Al to the total of the hetero atom, Al and P;

$$0.2 \leq z \leq 0.6 \tag{c}$$

wherein z indicates a molar ratio of P to the total of the hetero atom, Al and P.

Crystalline ferroaluminophosphate (hereinafter referred to as FAPO), a type of zeolite having Fe as the hetero atom therein; and crystalline silicoaluminophosphate (hereinafter referred to as SAPO), another type of zeolite having Si as the hetero atom therein are described hereinunder.

(Ratio of Constituent Atoms in FAPO)

In FAPO that is preferred for the adsorbent for regenerator systems of the invention, it is desirable that Fe, Al and P are in the framework structure in a molar ratio of the following formulae (1) to (3):

$$0.001 \leq x \leq 0.3 \tag{1}$$

wherein x indicates a molar ratio of Fe to the total of Fe, Al and P;

$$0.2 \leq y \leq 0.6 \tag{2}$$

wherein y indicates a molar ratio of Al to the total of Fe, Al and P;

$$0.3 \leq z \leq 0.6 \tag{3}$$

wherein z indicates a molar ratio of P to the total of Fe, Al and P.

More preferably, the atoms are in a molar ratio of the following formulae (1') to (3') where x, y and z have the same meanings as above:

$$0.01 \leq x \leq 0.25 \tag{1'}$$

$$0.23 \leq y \leq 0.58 \tag{2'}$$

$$0.33 \leq z \leq 0.58 \tag{3'}.$$

Even more preferably, the atoms are in a molar ratio of the following formulae (1") to (3") where x, y and z have the same meanings as above:

$$0.03 \leq x \leq 0.20 \tag{1"}$$

$$0.25 \leq y \leq 0.55 \tag{2"}$$

$$0.35 \leq z \leq 0.55 \tag{3"}.$$

FAPO may be an adsorbent that has a large adsorption amount at a low relative humidity (relative vapor pressure) and is characterized in that its adsorption amount is small at an extremely low humidity (low relative vapor pressure) on its adsorption isotherm. The reason will be because, in the adsorbent that has Fe in its framework structure within the range as above, the charge may be apparently compensated for between the trivalent Fe and the pentavalent P, and, as a result, the polarity of the framework structure of the adsorbent of the type may be small as compared with any other adsorbent of the same crystal structure that contains any other element than Fe in the framework structure thereof (for example, Si-containing SAPO), and, when compared with AlPO that contains only Al and P in the framework structure thereof, the FAPO adsorbent of the type has two different types of trivalent elements Fe and Al and therefore it may have polarity more readily than AlPO.

In case where the molar ratio of Fe in FAPO is over the range as above, the structure stability of FAPO may lower. On the other hand, if the molar ratio of Fe therein is smaller than the range, it is also unfavorable since the structure stability of FAPO of the type may also lower and, in addition, the iron component of the compound may be ineffective for the adsorbability of FAPO since its content is small.

The framework structure of FAPO may contain any other element than Fe, Al and P, and the additional element, if any, does not have any negative influence on the adsorption-desorption property of the compound. The additional element includes, for example, silicon, lithium, magnesium, titanium, zirconium, vanadium, chromium, manganese, cobalt, nickel, palladium, copper, zinc, gallium, germanium, arsenic, tin, calcium and boron. In general, the molar ratio of the additional element (M) to iron (Fe), M/Fe is at most 3, preferably at most 2, more preferably at most 1, even more preferably at most 0.5. The molar ratio of the additional element that falls within the range produces an advantage in that the adsorption capability of iron in the compound is remarkable. However, if the molar ratio of the additional element to Fe is larger than 3, then the adsorption capability of iron in the compound may lower.

FAPO may contain a cation that is exchangeable with any other cation, and the cation in that case includes, for example, proton; alkali elements such as Li, Na, K; alkaline earth elements such as Mg, Ca; rare earth elements such as La, Ce; and transition metal elements such as Fe, Co, Ni. Of those, preferred are proton, alkali elements and alkaline earth elements in view of the adsorbability and the stability of the compound FAPO.

The atomic molar ratio in the compound may be determined through element analysis, for which a sample of the compound to be analyzed is dissolved under heat in an aqueous hydrochloric acid solution and this is subjected to ICP analysis.

(Crystal Structure of FAPO)

For FAPO for the adsorbent for regenerator systems of the invention, especially preferred is one that has a crystal structure as in Table 1 below which shows the peaks at 2θ, and this is hereinafter referred to as FAPO-2. More preferred is FAPO that has a relative intensity as in Table 1, and FAPO having the crystal structure of the type is a novel compound.

Table 1 shows diffraction angles (2θ) at which the compound, FAPO-2 gives essential diffraction peaks in powdery X-ray diffractiometry. In general, powdery X-ray diffractiometry is effected in air, the sample analyzed herein is re-hydrated in atmospheric air. For the relative intensity in Table 1, the symbols vs, s, m, w and vw mean very strong, strong, medium, weak and very weak, respectively.

TABLE 1

| Number | 2θ | Relative Intensity |
|---|---|---|
| 1 | 9.5 ± 0.3 | vs |
| 2 | 10.1 ± 0.3 | w-s |
| 3 | 12.8 ± 0.3 | w |
| 4 | 19.5 ± 0.3 | w-s |
| 5 | 20.4 ± 0.3 | w-m |
| 6 | 24.3 ± 0.3 | w-m |
| 7 | 30.7 ± 0.4 | w-m |

*) X-ray wavelength = 1.54184 Å (Cu-Kα).

In table 1, the second peak at the diffraction angle 10.1±0.3 preferably gives a value, I/Io×100 mentioned below of at least 10, as it well reflects the characteristic of the structure of the compound, more preferably at least 15. The fourth peak at the diffraction angle 19.5±0.3 preferably gives a value, I/Io×100 of at least 10, as it well reflects the characteristic of the structure of the compound, more preferably at least 15.

The fourth peak may be generally divided into two peaks in most cases, but depending on some delicate differences in the condition of the sample to be analyzed and in the condition for measurement, the two peaks may overlap to be one peak. Anyhow, the compound shall have at least one peak that satisfies the value of I/Io×100 within the range of the diffraction angle 19.5±0.3.

(Determination of Crystal Structure)

The X-ray diffractiometric peaks in Table 1 above are those derived from the X-ray diffraction pattern drawn by the use of a standard powdery X-ray diffractiometer. Concretely, one method of the X-ray diffractiometry comprises using Cu as the target and an X-ray tube with a controlled output of 40 kV and 30 mA as the ray source, monochromatizing the X-ray diffracted by the sample by the use of a monochrometer, and detecting it. Regarding the optical condition in the method, the divergent slit is at 1°, the scattering slit is at 1°, the receiver slit is 0.2 mm, and the position of the diffraction peak is at 2θ (diffraction angle). θ is the Bragg angle seen on the recording paper. The spacing of lattice planes (d) is derived from the Bragg's conditional expression, 2d sin θ=λ, in which λ=1.5418 Å. The peak position is indicated by the top of the peak. The intensity is derived from the height of the diffraction peak from which the background has been subtracted, and it is indicated by I/Io×100. In this, Io is the intensity of the strongest peak; and I is the intensity of any other peak. In the invention, Io is generally for the peak at 2θ=9.5±0.2°. In general, the measurement of 2θ is influenced by both man-made error and mechanical error. Taking the errors into consideration, the acceptable ± error range of the measured data is defined as approximately ±0.30.

FAPO-2 mentioned above, which is preferred in the invention, is further characterized in that its powdery X-ray diffractiometry peaks vary through its adsorption and desorption of water. Specifically, while it has adsorbed water, its powdery X-ray diffraction pattern has the peaks as in Table 1, but after it has desorbed water, its powdery X-ray diffraction pattern has the peaks as in Table 2. The diffraction pattern change depending on its adsorption and desorption of water may be determined, for example, through analysis with an XRD-DSC device (Rigakusha's heat flux-type DSC, RINT2000). The symbols for the relative intensity in Table 2 are the same as in Table 1.

The X-ray diffraction peaks in Table 1 and Table 2 are those of the CHA-type.

TABLE 2

| Number | 2θ | Relative Intensity |
|---|---|---|
| 1 | 9.5 ± 0.3 | vs |
| 2 | 13.0 ± 0.3 | w |
| 3 | 16.0 ± 0.3 | w-m |
| 4 | 20.7 ± 0.3 | m-s |
| 5 | 26.0 ± 0.3 | w-m |
| 6 | 30.8 ± 0.4 | w-m |

*) X-ray wavelength = 1.54184 Å (Cu-Kα).

FAPO having the X-ray diffraction peaks as in Table 2 above may contain a template, in which a part or all of the template may be removed through calcination in nitrogen or the like.

So far as its crystal structure has the characteristics as above, FAPO-2 having at least the X-ray diffraction peaks as in Table 1 may contain any other element in its framework structure. Like in the above, the additional element includes, for example, silicon, lithium, magnesium, titanium, zirconium, vanadium, chromium, manganese, cobalt, nickel, palladium, copper, zinc, gallium, germanium, arsenic, tin, calcium, boron. In general, when the additional element content of the compound is over its limit, the compound does not give at least the X-ray diffraction peaks as in Table 1. The additional element content limit is at most 1 in terms of the molar ratio, M/Fe in which M indicates the additional element and Fe indicate iron in the compound. Preferably, the molar ratio is at most 0.7 more preferably at most 0.5, as it more readily gives the structure of FAPO as in Table 1.

So far as its crystal structure has the characteristics as above, the zeolite of the type may contain a cation type that is exchangeable with any other cation. In that case, the cation includes, for example, proton; alkali elements such as Li, Na, K; alkaline earth elements such as Mg, Ca; rare earth elements such as La, Ce; and transition metal elements such as Fe, Co, Ni. Of those, preferred are proton, alkali elements and alkaline earth elements.

(Ratio of Constitutive Atoms of SAPO)

Next described is SAPO (crystalline silicoaluminophosphate) favorable for the adsorbent for regenerator systems of the invention.

The molar ratio of the constituent elements, Si, Al and P in the framework structure of SAPO for use in the invention preferably satisfies the following formulae (4) to (6):

$$0.09 < p \leq 0.3 \quad (4)$$

wherein p indicates a molar ratio of Si to the total of Si, Al and P;

$$0.3 \leq q \leq 0.6 \quad (5)$$

wherein q indicates a molar ratio of Al to the total of Si, Al and P;

$$0.3 \leq r \leq 0.6 \quad (6)$$

wherein r indicates a molar ratio of P to the total of Si, Al and P.

More preferably, Si and Al satisfy the following formulae (4') and (5') in point of their molar ratio, in which p and q have the same meanings as above.

$$0.092 \leq p \leq 0.25 \quad (4')$$

$$0.33 \leq q \leq 0.58 \quad (5').$$

So far as the elements Si, Al and P are within the range as above therein, the framework structure of the compound may contain any other element not having any negative influence on the adsorption and desorption characteristics of the compound. The additional element includes, for example, lithium, magnesium, titanium, zirconium, vanadium, chromium, manganese, cobalt, nickel, palladium, copper, zinc, gallium, germanium, arsenic, tin, calcium, boron. The zeolite of the type may contain a cation type that is exchangeable with any other cation. In that case, the cation includes, for example, proton; alkali elements such as Li, Na, K; alkaline earth elements such as Mg, Ca; rare earth elements such as La, Ce; and transition metal elements such as Fe, Co, Ni. Of those, preferred are proton, alkali elements and alkaline earth elements from the viewpoint of the adsorption capability and the stability of the compound.

As so mentioned hereinabove, SAPO contains Al, P and Si in its framework structure. In SAPO, Si is tetravalent, and when the tetravalent Si is substituted with a trivalent Al or a pentavalent P, then the compound may be polar. Accordingly, with the increase in Si therein, SAPO become preferable since its water adsorption may start under a lower humidity condition (that is, under a lower relative vapor pressure condition). When the molar ratio of Si to the total of Si, Al and P in SAPO is larger than 9%, then SAPO of the type may adsorb an adsorbate (e.g., water vapor) even in an extremely low relative humidity region (that is, even in an extremely low relative vapor pressure region) like Y-type zeolite. Accordingly, the Si content of SAPO is preferably larger, but if it is too large, the structure of SAPO could not be stable. Therefore, the uppermost limit of the Si content of SAPO may be approximately 30% or so. Preferably, the molar ratio of Si is at least 9.3%, more preferably at least 9.5%.

As compared with FAPO, SAPO may start to adsorb an adsorbate within a lower humidity region (that is, within a lower relative vapor pressure region), and is therefore relatively disadvantageous in point of its desorption process. Like FAPO, however, SAPO also depends on the ambient temperature in point of its adsorption-desorption property. Therefore, as compared with Y-type zeolite that depends little on temperature, SAPO is advantageous in that it may readily desorb water even by the action of waste heat at approximately 100° C. or so.

The molar ratio of the constituent elements on SAPO is determined through elementary analysis, for which, a sample of SAPO to be analyzed is dissolved under heat in an aqueous hydrochloric acid solution and subjected to ICP analysis.

(Production Condition for FAPO and SAPO)

The production condition for FAPO and SAPO is not specifically defined. In general, an aluminium source, an iron or silicon source, a phosphorus source and a template are mixed, and the intended FAPO or SAPO is produced in a hydrothermal synthesis method. The part that is common to the production of both FAPO and SAPO and the part that differs in the production of FAPO and SAPO are described below with reference to some examples thereof.

First mixed are an aluminium source, an iron or silicon source, a phosphorus source, and a template.

Aluminium Source:

The aluminium source is not specifically defined, generally including, for example, pseudoboehmite, aluminium alkoxides such as aluminium isopropoxide and aluminium triethoxide, as well as aluminium hydroxide, alumina sol, sodium aluminate. Of those, preferred is pseudoboehmite as it is easy to handle and its reactivity is high.

Iron Source:

The iron source is an essential material for FAPO. The iron source is not also specifically defined, generally including, for example, iron salts of inorganic acids such as iron sulfate, iron nitrate, iron phosphate, iron chloride, iron bromide; iron salts of organic acids such as iron acetate, iron oxalate, iron citrate; and iron-organometallic compounds such as iron-pentacarbonyl, ferrocene. Of those, preferred are iron salts of inorganic acids and those of organic acids as readily soluble in water. More preferred are iron salts of inorganic acids such as ferric nitrate and ferrous sulfate. As the case may be, colloidal iron hydroxide may also be used.

Silicon Source:

The iron source is an essential material for SAPO. It includes, for example, fumed silica, silica sol, colloidal silica, water glass, ethyl silicate, methyl silicate.

Phosphorus Source:

For the phosphorus source, generally used is phosphoric acid, but aluminium phosphate may also be used.

Other Elements:

The framework structure of FAPO and SAPO may contain any other element not interfering with the adsorption-desorption characteristics of the compounds mentioned hereinabove. The additional element includes, for example, silicon, lithium, magnesium, titanium, zirconium, vanadium, chromium, manganese, cobalt, nickel, iron, palladium, copper, zinc, gallium, germanium, arsenic, tin, calcium, boron.

Template:

For the template, usable are any of quaternary ammonium salts such as tetramethylammonium, tetraethylammonium, tetrapropylammonium, tetrabutylammonium; and primary amines, secondary amines, tertiary amines and polyamines such as morpholine, di-n-propylamine, tri-n-propylamine, tri-n-isopropylamine, triethylamine, triethanolamine, piperidine, piperazine, cyclohexylamine, 2-methylpyridine, N,N-dimethylbenzylamine, N,N-diethanolamine, dicyclohexylamine, N,N-dimethylethanolamine, choline, N,N'-dimethylpiperazine, 1,4-diazabicyclo(2,2,2)octane, N-methyldiethanolamine, N-methylethanolamine, N-methylpiperidine, 3-methylpiperidine, N-methylcyclohexylamine, 3-methylpyridine, 4-methylpyridine, quinuclidine, N,N'-dimethyl-1,4-diazabicyclo-(2,2,2)octanedion, di-n-butylamine, neopentylamine, di-n-pentylamine, isopropylamine, t-butylamine, ethylenediamine, pyrrolidine, 2-imidazolidone, diisopropylethylamine, dimethylcyclohexylamine, cyclopentylamine, N-methyl-n-butylamine, hexamethyleneimine. These may be mixed for use herein. Of those, especially preferred are morpholine, triethylamine, cyclohexylamine, isopropylamine, diisopropylethylamine, N-methyl-n-butylamine and tetraethylammonium hydroxide in view of their reactivity; and more preferred for industrial use are morpholine, triethylamine and cyclohexylamine as they are inexpensive.

(Preparation of Aqueous Gel)

The above-mentioned aluminium source, iron or silicon source, phosphorus source and template are mixed to prepare an aqueous gel. The order of mixing them will vary depending on the condition for preparing the gel. In general, however, a phosphoric acid source and an aluminium source are first mixed, and then further mixed with an iron or silicon source and a template.

The aqueous gel composition for FAPO may be represented by $0.01 \leq FeO/P_2O_5 \leq 1.5$ in terms of the molar ratio of the oxides thereof, preferably by $0.02 \leq FeO/P_2O_5 \leq 1.0$ for easy production thereof, more preferably $0.05 \leq FeO/P_2O_5 \leq 0.8$. In the composition, the ratio of $P_2O_5/Al_2O_3$ may be from 0.6 to 1.7, preferably from 0.7 to 1.6 for easy production of the composition, more preferably from 0.8 to 1.5. The lowermost limit of the water content of the composition is at least 3 in terms of the molar ratio to $Al_2O_3$, preferably at least 5 for easy production of the composition, more preferably at least 10. The uppermost limit of the water content thereof is at most 200, preferably at most 150 for easy production thereof and in view of the productivity thereof, more preferably at most 120. The aqueous gel may have a pH of from 4 to 10, preferably from 5 to 9 for easy production thereof, more preferably from 5.5 to 8.5.

The aqueous gel composition for SAPO may be represented by $0.2 \leq SiO_2/Al_2O_3 \leq 2$ in terms of the molar ratio of the oxides thereof, preferably by $0.3 \leq SiO_2/Al_2O_3 \leq 1.8$ for easy production thereof, more preferably $0.4 \leq SiO_2/Al_2O_3 \leq 1.5$. In the composition, the ratio of $P_2O_5/Al_2O_3$ may be from 0.6 to 1.4, preferably from 0.7 to 1.3 for easy production of the composition, more preferably from 0.8 to 1.2. The lowermost limit of the water content of the composition is at least 3 in terms of the molar ratio to $Al_2O_3$, preferably at least 5 for easy production of the composition, more preferably at least 10. The uppermost limit of the water content thereof is at most 200, preferably at most 150 for easy production thereof and in view of the productivity thereof, more preferably at most 120. The aqueous gel may have a pH of from 55 to 10, preferably from 6 to 9 for easy production thereof, more preferably from 6.5 to 8.5.

The aqueous gel may optionally contain any other component than the above. The additional component includes, for example, alkali metal or alkaline earth metal hydroxides and salts, and hydrophilic organic solvents such as alcohols.

(Hydrothermal Synthesis)

In a process of hydrothermal synthesis, the aqueous gel prepared in the above is put into a pressure vessel, and kept at a predetermined temperature therein while stirred or while kept static, under self-pressure or under external pressure not interfering with crystallization. Regarding its condition, the temperature for hydrothermal synthesis may fall between 100 and 300° C., preferably between 120 and 250° C. for easy synthesis, more preferably between 150 and 220° C.

The reaction time may fall between 3 hours and 30 days for FAPO, preferably between 5 hours and 15 days for easy synthesis, more preferably between 7 hours and 7 days. After the process of hydrothermal synthesis, the product is separated, washed with water, dried and calcined to thereby remove the organic matter from it. Thus is obtained FAPO, a type of zeolite. On the other hand, the reaction time for SAPO may fall between 3 hours and 30 days, preferably between 5 hours and 7 days for easy synthesis, more preferably between 7 hours and 3 days. After the process of hydrothermal synthesis, the product is separated, washed with water, dried and calcined to thereby remove the organic matter from it. Thus is obtained SAPO, another type of zeolite.

(Preparation of Crystal Structure)

Finally, the template is removed from FAPO to give a crystal structure that has the diffraction peaks as in Table 1 or Table 2.

As so mentioned hereinabove, FAPO-2 having the diffraction peaks as in Table 1 is a novel compound, and this may be obtained by calcining FAPO having the diffraction peaks as in Table 2, in the presence of an oxygen-containing gas.

The calcination temperature may fall between 200° C. and 800° C., preferably between 300° C. and 700° C. for easy template removal and/or for easy crystal structure conversion, more preferably between 400° C. and 650° C. The calcination time may fall between 1 minute and 15 hours, preferably between 2 minutes and 10 hours for easy template removal and/or for easy crystal structure conversion, even more preferably between 5 minutes and 8 hours. The calcination time as referred to herein is meant to indicate an apparent time for which the object to be substantially calcined is in the processing temperature atmosphere. Accordingly, the calcination time shall be designed with the matter taken into consideration that the actual processing time in a device may vary in some degree depending on the device to be used and the amount of the sample to be processed even though it may be apparently the same.

The oxygen concentration in the calcining gas may be at least 2 vol. %, preferably at least 3 vol. % for easy template removal and/or for easy crystal structure conversion, even more preferably at least 5 vol. %. The gas except oxygen that may be in the calcining gas may be inert gas such as nitrogen, argon, helium. As the case may be, water vapor and nitrogen oxide may be in the calcining gas to a degree of up to 10% in terms of the ratio thereof by volume. The calcining gas may be or may not be circulated inside the processing device. If so, the calcining gas is preferably circulated inside it at the weight-hourly space velocity (WHSV) thereof relative to the sample to be calcined. Concretely, the weight-hourly space velocity (WHSV) is at most 20/hr, preferably at most 15/hr for easy template removal and/or for easy crystal structure conversion, more preferably at most 10/hr. The calcining device may be any and every heating device such as muffle furnace or tubular furnace, and it may be in any mode of fixed bed or fluidized bed.

(Other Methods for Producing FAPO)

One preferred method for producing FAPO that has the diffraction peaks as in Table 2 is described below. Also in this case, FAPO is produced by first mixing an aluminium, source, an iron source, a phosphorus source and a template followed by subjecting the resulting mixture to hydrothermal synthesis, like in the above. This production method is characterized by the template to be mixed. This will be described in detail hereinunder.

First, an aluminium source, an iron source, a phosphorus source and a template are mixed.

Aluminium Source:

The aluminium source is not specifically defined, generally including, for example, pseudoboehmite, aluminium alkoxides such as aluminium isopropoxide and aluminium triethoxide, as well as aluminium hydroxide, alumina sol, sodium aluminate. Of those, preferred is pseudoboehmite as it is easy to handle and its reactivity is high.

Iron Source:

The iron source is not also specifically defined, generally including, for example, iron salts of inorganic acids such as iron sulfate, iron nitrate, iron phosphate, iron chloride, iron bromide; iron salts of organic acids such as iron acetate, iron oxalate, iron citrate; and iron-organometallic compounds such as iron-pentacarbonyl, ferrocene. Of those, preferred are iron salts of inorganic acids and those of organic acids as readily soluble in water. More preferred are ferrous compounds such as ferrous sulfate.

Phosphorus Source:

For the phosphorus source, generally used is phosphoric acid, but aluminium phosphate may also be used.

Other Elements:

The framework structure of FAPO may contain any other element so far as it may finally have a powdery X-ray diffraction pattern that gives at least the X-ray diffraction peaks as in Table 1 and table 2. The additional element includes, for example, silicon, lithium, magnesium, titanium, zirconium, vanadium, chromium, manganese, cobalt, nickel, palladium, copper, zinc, gallium, germanium, arsenic, tin, calcium, boron.

Template:

For the template, usable are any of quaternary ammonium salts such as tetraethylammonium salts, tetrapropylammonium salts, tetramethylammonium salts, tetrabutylammonium salts; and other various amines. The amines include, for example, (1) alicyclic heterocyclic compounds with nitrogen as the hetero atom; (2) amines with a cycloalkyl group; and (3) amines with an alkyl group. These may be used singly. However, when quaternary ammonium salts are used singly, compounds of poor crystallinity may be produced. Therefore, it is desirable that at least one compound of at least one group of the above-mentioned three amine groups is selected and used herein.

The amines are described in more detail hereinunder.

First described are alicyclic heterocyclic compounds with nitrogen as the hetero atom. The alicyclic heterocyclic compounds with nitrogen as the hetero atom are generally 5- to 7-membered rings but are preferably 6-membered rings. The number of the hetero atoms to be in the hetero ring is generally at most 3, preferably at most 2. Except nitrogen, the type of the hetero atom is not specifically defined, but preferably includes oxygen in addition to nitrogen in view of the easiness in producing the compounds. The position of the hetero atom in the compounds is not also specifically defined. Preferably, however, two hetero atoms are not adjacent to each other in the compounds in view of the easiness in producing the compounds. The molecular weight of the compounds may be at most 250 but preferably at most 200 in view of the easiness in producing them, more preferably at most 150.

The alicyclic heterocyclic compounds with nitrogen as the hetero atom include, for example, morpholine, N-methylmorpholine, piperidine, piperazine, N,N'-dimethylpiperazine, 1,4-azabicyclo(2,2,2)octane, N-methylpiperidine, 3-methylpiperidine, quinuclidine, pyrrolidine, N-methylpyrrolidone, hexamethyleneimine. Of those, preferred are morpholine, hexamethyleneimine and piperidine as they are easy to produce; and more preferred is morpholine.

Next described are amines with a cycloalkyl group. The number of the cycloalkyl groups to be in the amines with a cycloalkyl group is preferably at most 2 in one molecule of the amine, more preferably 1. The number of the carbon atoms to constitute the cycloalkyl group may be generally from 5 to 7, but is preferably 6. The number of the cyclo-rings of the cycloalkyl group is not specifically defined, but, in general, it is preferably 1. Also preferably, the cycloalkyl group is bonded to the nitrogen atom of the amine compound in view of the easiness in producing the compounds. The molecular weight of the compounds may be at most 250, but is preferably at most 200 in view of the easiness in producing them, more preferably at most 150.

The amines with a cycloalkyl group of the type include, for example, cyclohexylamine, dicyclohexylamine, N-methylcyclohexylamine, N,N-dimethylcyclohexylamine, cyclopentylamine. Especially preferred is cyclohexylamine.

Next described are amines with an alkyl group. In the amines with an alkyl group, the number of the alkyl groups to be in one molecule of the amine is not specifically defined, but is preferably 3. The number of the carbon atoms to constitute the alkyl group is preferably at most 4. More preferably, the total of the carbon atoms to constitute all the alkyl groups in one molecule of the amine is at most 10. The molecular weight of the compounds may be at most 250, but is preferably at most 200 in view of the easiness in producing them, more preferably at most 150.

The amines with an alkyl group of the type include, for example, di-n-propylamine, tri-n-propylamine, tri-isopropylamine, triethylamine, triethanolamine, N,N-diethylethanolamine, N,N-dimethylethanolamine, N-methyldiethanolamine, N-methylethanolamine, di-n-butylamine, neopentylamine, di-n-pentylamine, isopropylamine, t-butylamine, ethylenediamine, diisopropylethylamine, N-methyl-n-butylamine. Of those, preferred are di-n-propylamine, tri-n-propylamine, triisopropylamine, triethylamine, di-n-butylamine, isopropylamine, t-butylamine, ethylenediamine, diisopropylethylamine, and N-methyl-n-butylamine, as they are easy to produce. More preferred is triethylamine.

One or more of these amines may be combined for the template source for hydrothermal synthesis of FAPO. In case where one is selected from these, it is preferably (1) morpholine selected from alicyclic heterocyclic compounds with nitrogen as the hetero atom, or (2) cyclohexylamine selected from amines with a cycloalkyl group. More preferably, it is morpholine.

For preferred combinations for the template, at least one compound is selected from at least two groups of (1) alicyclic heterocyclic compounds with nitrogen as the hetero atom, (2) amines with a cycloalkyl group, and (3) amines with an alkyl group. The advantage and/or the effect of the combination of the type are that FAPO of which the constituent elements are in a desired ratio as well as FAPO of high crystallinity is easy to produce. In particular, a combination of at least two compounds selected from the group (1) of alicyclic heterocyclic compounds with nitrogen as the hetero atom is more preferred, since FAPO of which the constituent elements are in a desired ratio and also FAPO of higher crystallinity are easier to produce. Concretely, one preferred combination comprises at least two of morpholine, triethylamine and cyclohexylamine, and a more preferred combination indispensably contains morpholine for at least two constituent components. The blend ratio of the compounds for the template shall be suitably determined depending on the reaction condition. For example, the molar ratio of two templates to be combined may fall between 1/20 and 20/1, but preferably between 1/10 and 10/1 for easy production of FAPO having a desired elementary ratio or having a high degree of crystallinity, even more preferably between 1/5 and 5/1. The combination may contain any other template, which, however, should be generally at most 20 mol %, more preferably at most 10 mol %. The advantages of the specific templates for use herein are that they are inexpensive and are more readily handlable as compared with any other conventional ones (e.g., tetraethylammonium hydroxide) and they are poorly corrosive.

Combining the desired templates and selecting preferred reaction conditions brings about the advantages in that the crystallization speed for the intended FAPO is increased, zeolite of the intended FAPO having a desired structure is easy to produce, the structure of the product is stable and is hardly broken, and impurities are prevented from being formed. However, using one template alone is relatively inferior to using a combination of multiple templates in that the reaction latitude is narrow, the yield of the intended zeolite, FAPO is low and the crystallization speed for the intended zeolite FAPO is low. Accordingly, in producing FAPO of the invention (especially that with XRD as in Table 2), preferred is a combination of multiple templates. The advantage of the combination of the templates is that the synergistic effect of the thus-combined templates is far beyond the effect in using one template alone.

The mode of hydrothermal synthesis of FAPO in other production methods is almost the same as that of the above-mentioned ordinary hydrothermal synthesis except for the specific production conditions for FAPO.

First mixed are an iron source, an aluminium source, a phosphoric acid source, a template and water to prepare an aqueous gel. The order of mixing them is not specifically defined and may be suitably determined depending on the condition for preparing the gel. In general, however, a phosphoric acid source and an aluminium source are first mixed with water, and then further mixed with an iron source and a template.

The aqueous gel composition may vary depending on the easiness in producing the intended product. In terms of the molar ratio of the aluminium source, the iron source and the phosphoric acid source as their oxides, the value of $FeO/Al_2O_3$ is generally larger than 0 and up to 1.0, preferably up to 0.9, more preferably up to 0.8.

The ratio of $P_2O_5/Al_2O_3$ varies, depending on the easiness in producing the intended product, and is generally at least 0.6, preferably at least 0.8, more preferably at least 1. In general, it is at most 1.8, preferably at most 1.7, more preferably at most 1.6.

The overall amount of the template to be used has an influence on the easiness in producing the intended product and on the economical aspect of the invention. In general, the molar ratio of the template to $P_2O_5$ may be at least 0.2, preferably at least 0.5, more preferably at least 1; and it is generally at most 4, preferably at most 3, more preferably at most 2.5. The blend ratio of two or more different types of templates for use herein varies depending on the easiness in producing the intended product and should be determined in accordance with the condition for producing the product. As so mentioned hereinabove, for example, when morpholine and triethylamine are used as combined, the molar ratio of morpholine/triethylamine may fall between 0.05 and 20, preferably between 0.1 and 10, more preferably between 0.2 and 9. When at least one is selected from each one of at least two groups mentioned above and when the thus-selected templates are combined, then the order of mixing them is not specifically defined and, after the template has been prepared by mixing them, it may be further mixed with any other substance. As the case may be, each template may be mixed with any other substance before they are combined.

The amount of water to be added to the aqueous gel has some influence on the easiness in producing the intended product and on the economical aspect of the invention. In general, the molar ratio of water to $Al_2O_3$ may be at least 3, preferably at least 5, more preferably at least 10, and is generally at most 200, preferably at most 150, more preferably at most 120. The pH of the aqueous gel varies, depending on the easiness in producing the intended product, and is generally at least 4, preferably at least 4.5, more preferably at least 5, and is generally at most 10, preferably at most 9, even more preferably at most 8.

If desired, the aqueous gel may contain any other component, in addition to the components mentioned above. The advantage of the additional component in the gel is that it may produce some additional possibilities. The additional component includes, for example, alkali metal and alkaline earth metal hydroxides and salts, and hydrophilic solvents such as alcohols. The blend ratio of the additional component may have an influence on the easiness in producing the intended product. When an alkali metal or alkaline earth metal hydroxide or salt is added to the gel, then its molar ratio to $Al_2O_3$ may be generally at most 0.2, preferably at most 0.1. When a hydrophilic solvent such as alcohol or the like is added thereto, its ratio to water may be generally at most 0.5, preferably at most 0.3.

Under the condition, the aqueous gel is put into a pressure vessel, and kept at a predetermined temperature therein while stirred or while kept static, under self-pressure or under external pressure not interfering with crystallization.

The reaction temperature for hydrothermal synthesis has an influence on the easiness in producing the intended product and is generally not lower than 100° C., preferably not lower than 120° C., more preferably not lower than 150° C., but is generally not higher than 300° C., preferably not higher than 250° C., more preferably not higher than 220° C. The reaction time may also have an influence on the easiness in producing the intended product, and is generally not shorter than 2 hours, preferably not shorter than 3 hours, more preferably not shorter than 5 hours, but is generally not longer than 30 days, preferably not longer than 10 days, more preferably not longer than 4 days. The reaction temperature may be kept constant all the time during the reaction, but may be stepwise varied during it.

After thus produced through hydrothermal synthesis, the product is separated. The method of separating the product is not specifically defined. In general, it may be separated from the reaction mixture through filtration or decantation thereof, and then washed with water and dried at a temperature falling between room temperature and 150° C. to obtain the intended product, template-containing zeolite.

According to the production method described hereinabove, a ferroaluminophosphate (FAPO) that gives a powdery X-ray diffraction pattern with at least the X-ray diffraction peaks as in Table 2 is obtained.

When the product, FAPO thus produced is calcined in an inert gas such as nitrogen under the calcination condition mentioned above, then a part or all of the template may be removed from it and a ferroaluminophosphate that gives a powdery X-ray diffraction pattern with at least the X-ray diffraction peaks as in Table 2 is thus obtained.

(Adsorption-Desorption Characteristic of FAPO-2)

FAPO-2 mentioned above is widely utilized for catalysts for oxidation reaction or for reaction with acid, or for various adsorbents. Above all, it exhibits excellent properties as a water vapor adsorbent.

In case where FAPO-2 is used as a water vapor adsorbent, it may be used along with a binder component, for example, metal oxides such as silica, alumina or titania, or clay or the like, and along with any other component of high thermal conductivity. In this case, it is desirable that the zeolite content of FAPO-2 is at least 60% by weight of the water vapor adsorbent, FAPO-2. More preferably, the zeolite content is at least 70%, even more preferably at least 80%.

FAPO-2 of the invention that serves as such a water vapor adsorbent is characterized in that it adsorbs little water vapor within a range within which the relative vapor pressure is extremely low, but suddenly starts to adsorb water vapor under the condition of a relative vapor pressure that is slightly higher than that extremely low relative vapor pressure. This characteristic supports the possibility of the adsorbent in that it may adsorb water vapor even within a low humidity and high temperature range within which ordinary adsorbents could hardly adsorb water vapor, and it may desorb the adsorbate even at a relatively low temperature of approximately 100° C. or so. As opposed to this, known Y-type zeolite is characterized in that it may rapidly adsorb an adsorbate even within a range of an extremely low relative vapor pressure of almost nearly to 0, and therefore, when it desorbs the adsorbate, it requires a high temperature of generally 120° C. or higher. As compared with it, the adsorbent, FAPO of the invention may adsorb and desorb an adsorbate even at a temperature of approximately 100° C. and even at a temperature lower than it. Accordingly, the adsorbent of the invention is favorable for the applications to be done at such temperatures. The characteristics of FAPO-2 of the invention may be caused by the structure change thereof that is indicated by the powdery X-ray diffraction pattern change in water adsorption to and desorption from the adsorbent.

(Zeolite Except Aluminophosphates)

For zeolite having the adsorption characteristics of the invention, preferred are the aluminophosphates mentioned above. Not limited to them, however, any others than such aluminophosphates are also acceptable herein so far as they exhibit the adsorption characteristics that are intrinsic to the invention. For example, even when zeolite is aluminosilicate, it may satisfy the adsorption characteristics of the invention. At least a part of silicon and aluminium (or all of aluminium) in the framework of the aluminosilicate of that case may be substituted with any other atom of, for example, magnesium, titanium, zirconium, vanadium, chromium, manganese, iron, cobalt, zinc, gallium, tin, and boron. In the aluminosilicate, if the molar ratio of silicon to aluminium (or aluminium+hetero atom) is too small as in ordinary Y-type zeolite, then it may rapidly adsorb an adsorbate even within an extremely low humidity range; but if too large, it will be too hydrophobic to well adsorb water. Anyhow, such a too small or too large molar ratio of the constituent elements in the adsorbent is unfavorable to the invention. Accordingly, in general, ordinary synthetic Y-type zeolite or the like aluminosilicate may be processed with an aqueous acid or alkali solution, then post-processed under heat in a steam atmosphere, and subjected to ion-exchange treatment for metal introduction, and these treatments for it may be combined to obtain adsorbents having desired adsorption capabilities. In that case, the molar ratio of silicon/aluminium may fall generally between 3.1 and 15, preferably between 3.2 and 10, more preferably between 3.5 and 5. These zeolites may have an exchangeable cation group, in which the exchangeable cation group includes, for example, proton; alkali elements such as Li, Na; alkaline earth elements such as Mg, Ca; rare earth elements such as La, Ce; and transition metals such as Fe, Co, Ni, Zn. Preferred are proton, alkali elements, alkaline earth elements, and transition metal elements; and more preferred are proton, Li, Na, Ca, Mg, Zn. Some different types of these elements may be in the adsorbent, so far as the adsorbent satisfies the adsorption characteristics mentioned below.

The adsorbents mentioned above are described below for their adsorption-desorption characteristics.

The adsorbents mentioned above, high-Si SAPO, FAPO, and FAPO (FAPO-2) having diffraction peaks as in Table 1 above are characterized by the following: On the adsorption isotherm thereof measured at 55° C., the adsorbate adsorption amount by the adsorbent is at most 0.12 g/g, preferably at most 0.1 g/g at a relative vapor pressure of 0.02 and is at least 0.13 g/g, preferably at least 0.15 g/g at a relative vapor pressure of 0.1, and the adsorbent has a relative vapor pressure region to give an adsorbate adsorption amount change of at least 0.08 g/g when the relative vapor pressure thereof has changed by 0.05 in a range of the relative vapor pressure thereof of from 0.02 to 0.1.

The adsorbents, FAPO and FAPO-2 are characterized by the excellent adsorption-desorption thereof which is as follows: On the adsorption isotherm thereof measured at 55° C., the adsorbate adsorption amount by the adsorbent is at most 0.05 g/g at a relative vapor pressure of 0.02 and is at least 0.2 g/g at a relative vapor pressure of 0.1, and the adsorbent has a relative vapor pressure region to give an adsorbate adsorption amount change of at least 0.15 g/g when the relative vapor pressure thereof has changed by 0.05 in a range of the relative vapor pressure thereof of from 0.02 to 0.1.

Of the adsorbents mentioned above, FAPO-2 is specifically characterized by the excellent adsorption-desorption thereof which is as follows: On the adsorption isotherm thereof measured at 55° C., the adsorbate adsorption amount by the adsorbent is at most 0.05 g/g at a relative vapor pressure of 0.02 and is at least 0.2 g/g at a relative vapor pressure of 0.08, and the adsorbent has a relative vapor pressure region to give an adsorbate adsorption amount change of at least 0.15 g/g when the relative vapor pressure thereof has changed by 0.02 in a range of the relative vapor pressure thereof of from 0.02 to 0.08; and on the adsorption isotherm thereof, its rising up is steep. Having such excellent adsorption-desorption characteristics, FAPO-2 still enables adsorption even in a low-humidity and high-temperature region in which ordinary adsorbent could hardly adsorb adsorbate, and, in addition, it enabled desorption of the adsorbate even at a relatively low temperature of approximately 100° C. or so. Based on these characteristics thereof, FAPO-2 is utilized as a water vapor adsorbent for adsorption-type regenerator devices, desiccants, moisture removal systems, regenerator systems and others, in which the adsorbent FAPO-2 improves the efficiency of the devices and the systems and makes it possible to drive the devices and the systems even under the condition under which they could not be driven.

The specific adsorbents of the invention that have particular adsorption characteristics comprise a specific zeolite. Depending on the applications of the adsorbents of the invention, the zeolite for them may be granulated or processed in any desired manner like that for ordinary known adsorbents, not significantly detracting from the adsorption characteristics of the adsorbents of the invention.

(Heat of Adsorption)

In regenerator systems where the heat of adsorption is utilized, it is desirable that the adsorbent therein may give much heat of adsorption in addition to having the above-mentioned adsorption-desorption characteristics. The heat of adsorption of the adsorbent may be generally at least 55 kJ/mol, preferably at least 60 kJ/mol, more preferably at least 65 kJ/mol. Having such a high level of adsorption heat, the adsorbent is favorable since it may adsorb an adsorbate even at low humidity. The uppermost limit of the heat of adsorption of the adsorbent will be approximately 150 kJ/mol or so. This is because, if the heat of adsorption thereof is too high, the adsorbent could hardly desorb the adsorbate.

The heat of adsorption is measured by the use of a multi-microcalorimeter (MMC-5113) combined with a vapor adsorption heat meter (CSA-25G) (both by Tokyo Riko), at a temperature of 25° C. Prior to the measurement, the sample is pre-treated at 150° C. for 5 hours at 0.1 Pa. The overall quantity of heat that has been generated when the adsorption amount has reached 0.2 g/g is the integral quantity of heat, per mol of water, of adsorption of the sample analyzed.

Concretely, the adsorbent is analyzed for the heat of adsorption thereof as follows: The sample to be analyzed is pre-treated and put in a cell in an isotherm calorimeter, and water vapor is introduced little by little into the cell via a gas inlet mouth thereof, and the quantity of heat ($\partial Q$) that is generated every time with the vapor introduction and the adsorption amount ($\partial n$) at that time are measured. From these, a differential heat of adsorption ($qd(n)=\partial Q/(\partial n)$) is obtained; and from the integral value of the quantity of heat to give an adsorption amount of 0.2 g/g, the integral heat of adsorption of the sample is thus obtained. In this process, each adsorption is obtained according to a volume method that is based on the introduced pressure and the equilibrated pressure, and the quantity of heat is obtained as the integral value of the heat flow rate from the vapor introduction to the vapor equilibrium (heat flow rate, 0).

$$qint=\int_o^{na}qd(n)dn/\int_o^{na}dn=\Sigma\partial Q/\Sigma\partial n=:na=0.011 \text{ mol}/g=0.2 \text{ g/g}$$

The adsorbent of the invention gives such high heat of adsorption, in addition to having the above-mentioned adsorption-desorption characteristics. Therefore, different from ordinary Y-type zeolite that enables adsorption at a relative humidity of around 0, the adsorbent of the invention does not require relatively high temperatures for desorption from it, or that is, it may desorb the adsorbate at a relatively low temperature of approximately 100° C. or so. Accordingly, the adsorbent of the invention is favorable for regenerator systems.

The invention is described more concretely with reference to the following Examples and Comparative Examples. Table 17 given at the end of Examples is to summarize the characteristics of the absorbents of Examples 1 to 10 and Comparative Example 1.

EXAMPLE 1

Example 1 is to demonstrate FAPO-2 production by the use of morpholine and triethylamine as the template.

To a mixture of 28.05 g of water and 11.53 g of 85% phosphoric acid, gradually added was 6.8 g of pseudoboehmite (containing 25% water, manufactured by Condea), and stirred. This is liquid A. Apart from the liquid A, 2.78 g of ferrous sulfate 7-hydrate, 5.05 g of morpholine, 4.35 g of triethylamine and 29 g of water were mixed to prepare a liquid. This was gradually added to the liquid A, and stirred for 3 hours to prepare a starting reaction material having the following composition.

0.2FeSO$_4$:Al$_2$O$_3$:P$_2$O$_5$:1.16morpholine:0.86triethylamine:70H$_2$O.

The starting reaction material was fed into a 200-cc stainless autoclave with a Teflon (registered trade name) inner cylinder therein, and reacted at 160° C. for 4 days while kept static. After thus reacted, this was cooled, its supernatant was removed through decantation, and the deposit was recovered. Thus recovered, the deposit was washed three times with water, taken out through filtration, and then dried at 120° C. Thus obtained, the data of the powdery XRD of the FAPO intermediate were as in Table 3 below.

TABLE 3

| 2θ | Relative Intensity | Peak Number vs. Table 2 |
|---|---|---|
| 9.474 | 100 | 1 |
| 12.899 | 15.8 | 2 |
| 13.886 | 6.0 | |
| 16.037 | 25.3 | 3 |
| 17.636 | 10.8 | |
| 19.030 | 2.8 | |
| 20.653 | 74.3 | 4 |
| 21.931 | 7.0 | |
| 22.490 | 3.8 | |
| 23.045 | 4.1 | |
| 24.755 | 30.2 | |
| 26.011 | 21.4 | 5 |
| 28.034 | 5.0 | |
| 29.633 | 4.4 | |
| 30.744 | 39.5 | 6 |
| 31.609 | 1.9 | |
| 32.456 | 1.8 | |
| 33.341 | 3.9 | |
| 34.661 | 8.1 | |
| 35.890 | 4.3 | |
| 38.610 | 1.7 | |
| 39.891 | 2.3 | |
| 42.706 | 1.8 | |
| 47.940 | 2.3 | |
| 48.863 | 5.8 | |

3 g of the template-containing FAPO intermediate was sampled, and put into a vertical quartz calcining tube, heated up to 550° C. at a heating rate of 1° C./min with air being introduced thereinto at a flow rate of 100 ml/min, and then calcined as it was therein at 550° C. for 6 hours. Thus obtained, the zeolite (FAPO-2) was analyzed for XRD, and its data are given in the following Table.

TABLE 4

| 2θ | Relative Intensity | Peak Number vs. Table 1 |
|---|---|---|
| 9.585 | 100 | 1 |
| 10.190 | 59.4 | 2 |
| 12.139 | 3.0 | |
| 12.752 | 17.7 | 3 |
| 12.987 | 14.4 | |
| 14.910 | 3.9 | |
| 15.302 | 5.3 | |
| 15.607 | 7.6 | |
| 17.034 | 5.8 | |
| 19.451 | 45.4 | 4 |
| 19.678 | 59.9 | |
| 20.446 | 31.5 | 5 |
| 21.376 | 18.2 | |
| 22.544 | 10.7 | |
| 22.762 | 10.9 | |
| 24.108 | 7.6 | 6 |
| 24.359 | 34.3 | 6 |

TABLE 4-continued

| 2θ | Relative Intensity | Peak Number vs. Table 1 |
|---|---|---|
| 24.742 | 8.5 | |
| 25.643 | 8.2 | |
| 26.137 | 4.3 | |
| 26.751 | 15.0 | |
| 27.245 | 3.8 | |
| 27.997 | 22.8 | |
| 28.915 | 11.0 | |
| 29.235 | 25.8 | |
| 30.690 | 46.9 | 7 |
| 31.658 | 18.3 | |
| 32.459 | 10.1 | |
| 33.001 | 18.9 | |
| 33.637 | 4.9 | |
| 35.199 | 4.1 | |
| 36.542 | 6.3 | |
| 36.899 | 5.1 | |
| 38.255 | 3.1 | |
| 39.646 | 4.4 | |
| 39.907 | 2.2 | |
| 40.234 | 1.9 | |
| 41.575 | 3.4 | |
| 42.793 | 2.6 | |
| 43.517 | 2.8 | |
| 46.255 | 2.8 | |
| 46.923 | 1.7 | |
| 48.595 | 4.3 | |
| 49.155 | 4.4 | |
| 49.435 | 3.2 | |

This was dissolved under heat in an aqueous hydrochloric acid solution and subjected to ICP for elementary analysis. This confirmed that, in the framework structure of the compound, the constitutional ratio (by mol) of each element to the total of aluminium, phosphorus and iron is 13.8% for iron, 37.4% for aluminium and 48.8% for phosphorus.

Figure 5:
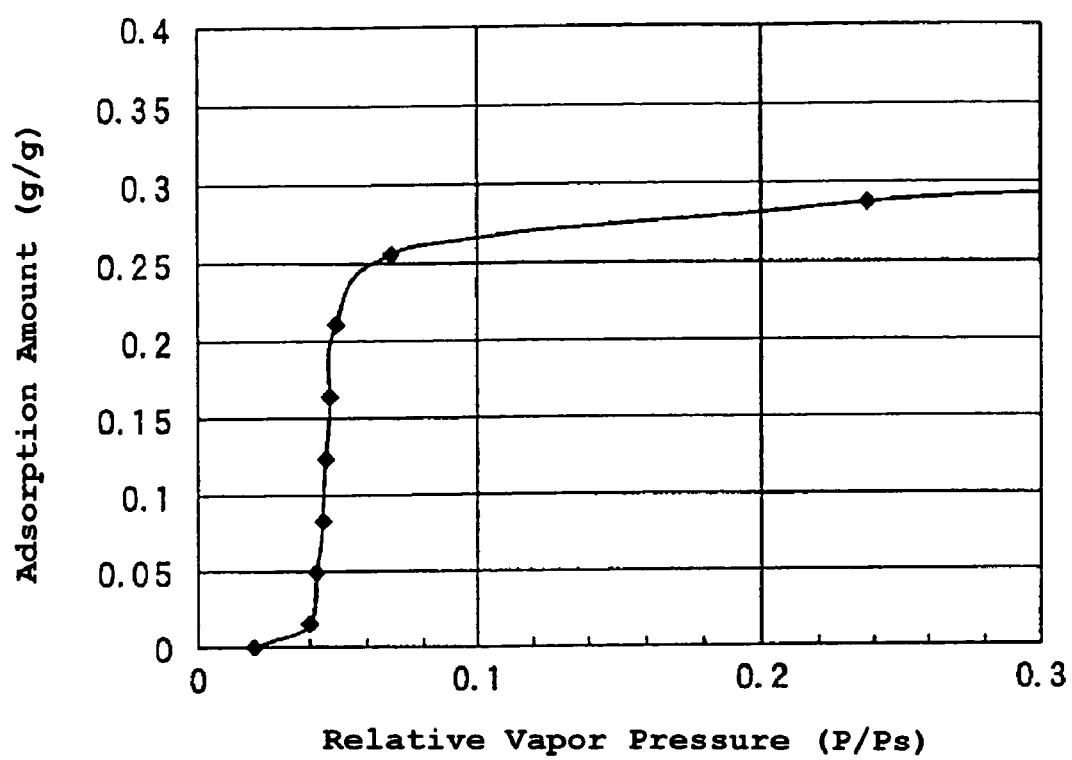
FIG. 5 is a water adsorption isotherm at 55° C. in Example 1.

FIG. 5 is a water vapor adsorption isotherm of the zeolite, measured at 55° C. by the use of an adsorption isothermometer (Bellsorb 18 by Nippon Bell). Prior to the measurement for the adsorption isotherm thereof, the sample was pre-treated in vacuum of at most 1 Pa, at 120° C. for 5 hours. Thus pre-treated, the sample was analyzed under the following condition: The temperature of air in a thermostat is 60° C.; the adsorption temperature is 55° C.; the initial pressure is 3.0 Torr; the number of pressure set point is 0; the saturated vapor pressure is 118.11 mmHg; the equilibrium time is 500 seconds. The heat of water adsorption by the zeolite was measured, and it was 64 kJ/mol.

The zeolite was further subjected to DSC-XRD. The details and the condition of the apparatus used for the analysis are as follows:

X-ray Diffractiometer
: RINT2000, Ultima+ series,
: DSC unit, heat flux-type DSC.

<XRD Condition>
X-ray used: CuKα,
Tube voltage, tube current: 40 kV, 50 mV,
Slit: DS=0.5 degrees, SS=0.5 degrees, RS=0.3 mm,
Method for measurement: continuous measurement with monochrometer,
Scanning range; 5 to 40 degrees.

<DSC Condition>
<1> Desorption Process:
from room temperature to 150° C.: humidity 0% nitrogen, heating rate of 5° C./min,
from 150° C. to 45° C.: humidity 0% nitrogen, cooling rate of 5° C./min.

<2> Adsorption Process:
constant at 45° C., humidity, 0, 5, 10, 15, 20, 30%.

Figure 6:
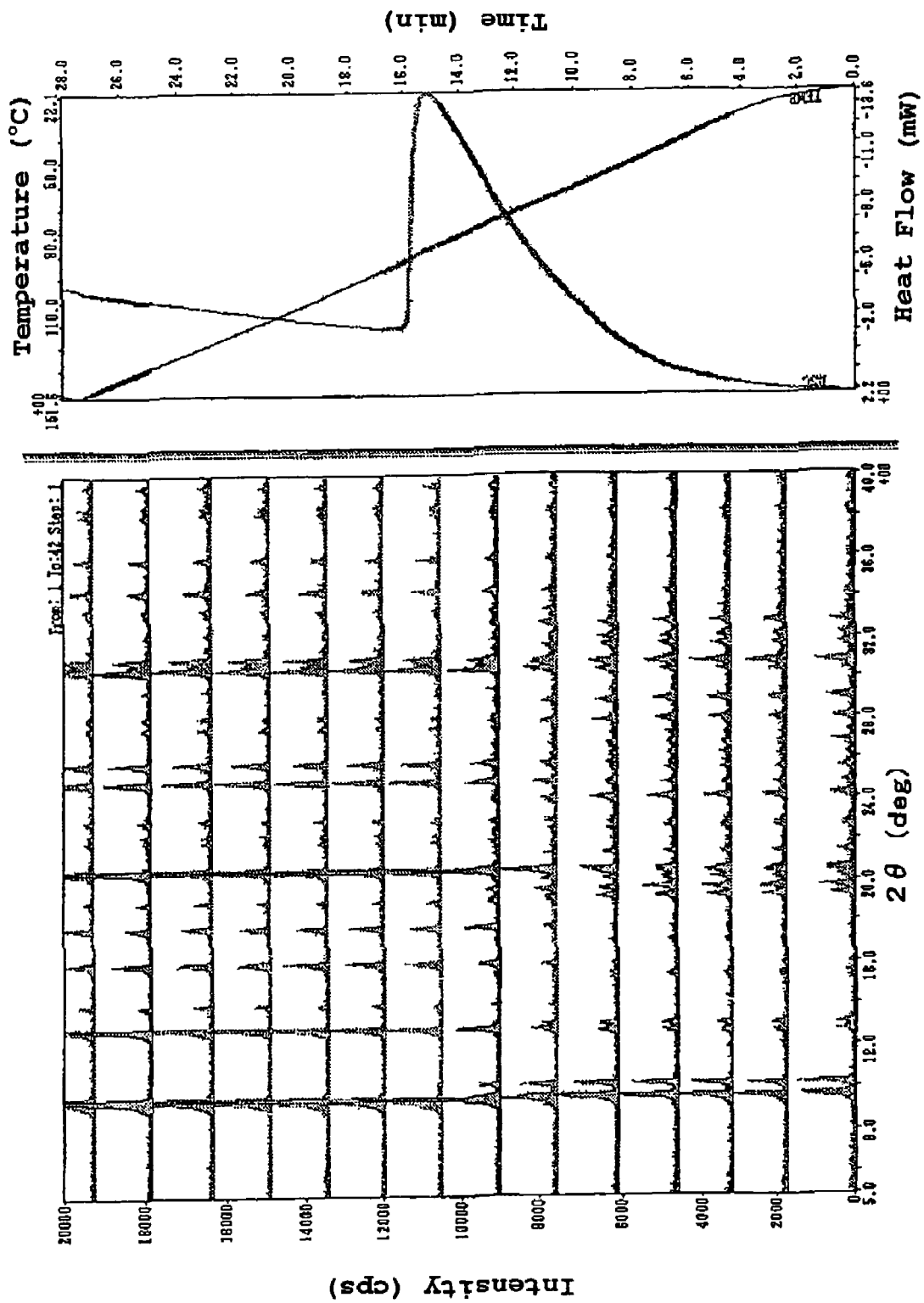
FIG. 6 is an XRD-DSC chart in water desorption in Example 1.
Figure 7:
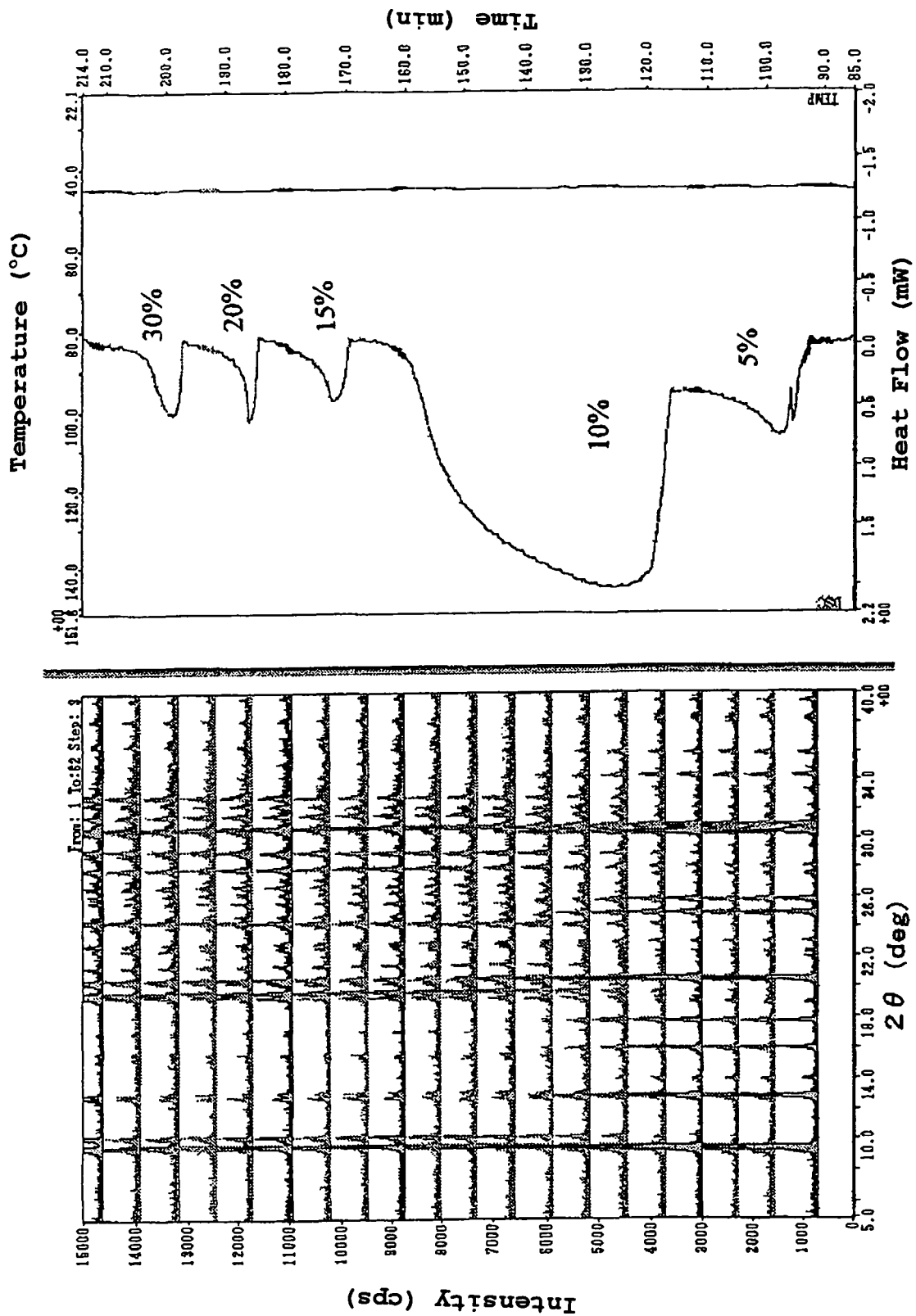
FIG. 7 is an XRD-DSC chart in water adsorption in Example 1.

FIG. 6 shows the XRD-DSC change of the sample, zeolite, which was set in the apparatus, and heated from room temperature (25° C.) up to 150° C. in a nitrogen atmosphere having a humidity of 0% so as to desorb the water that had been adsorbed by it. FIG. 7 shows the XRD-DSC change of the sample, from which water had been desorbed and which was then moisturized under the DSC condition as above so as to again adsorb water. As in FIG. 6 and FIG. 7, it is understood that the data of XRD changed with the desorption and adsorption of water to the sample, and this indicates the structure change of the sample through the water desorption and adsorption thereto.

Figure 8:
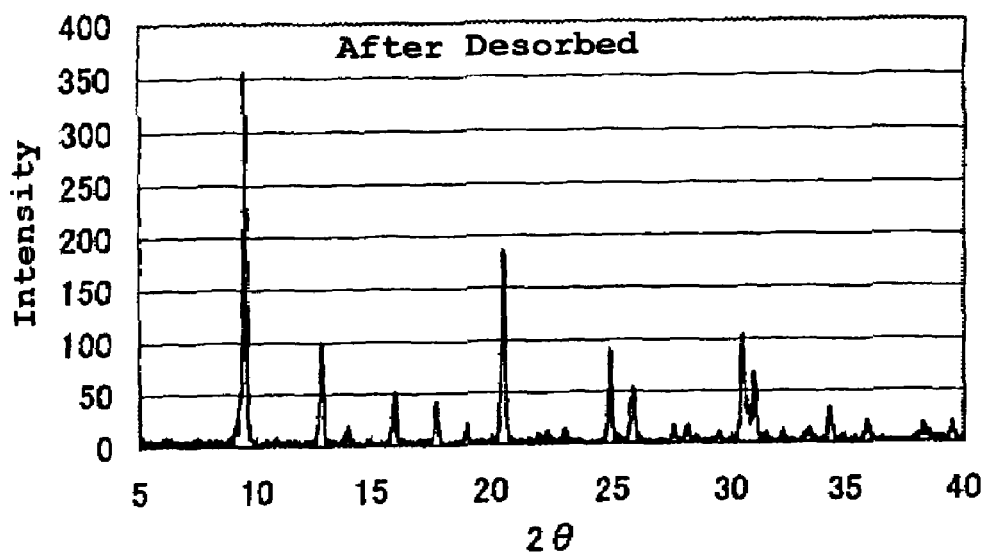
FIG. 8 shows the data of XRD, in which (a) shows the data in water desorption in Example 1 and (b) shows the data in water adsorption in Example 1.
Figure 8:
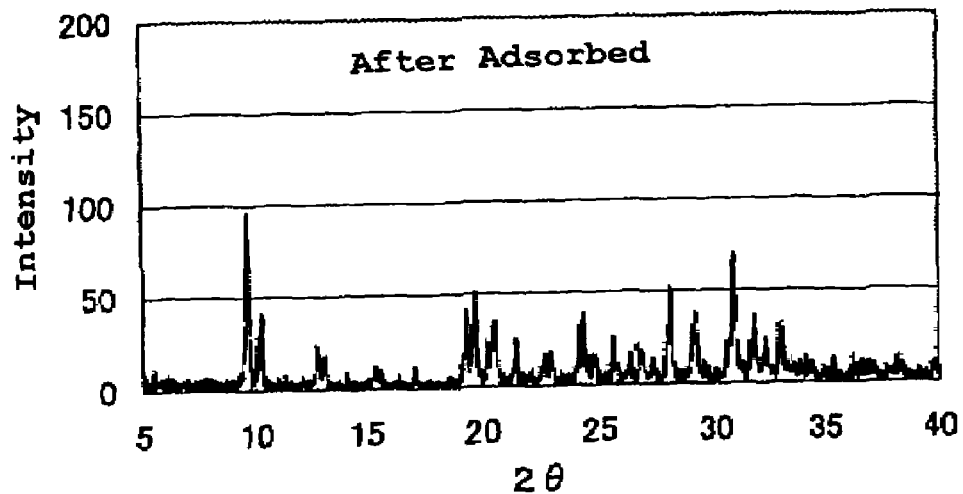

FIG. 8(*a*) shows an XRD pattern of the zeolite sample that had desorbed water (measured at 150° C. and a relative humidity of 0%); and FIG. 8(*b*) shows an XRD pattern thereof that had adsorbed water (measured at 45° C. and a humidity of 10%).

Table 5 and Table 6 below show the X-ray diffraction peaks in FIG. 8(*a*) and FIG. 8(*b*), respectively. As in these, the zeolite sample that had desorbed water gave a powdery X-ray diffraction pattern with at least the X-ray diffraction peaks as in Table 2, and, after having again absorbed water, it gave a powdery X-ray diffraction pattern with at least the X-ray diffraction peaks as in Table 1.

TABLE 5

| 2θ | Relative Intensity |
|---|---|
| 9.50 | 100 |
| 12.82 | 28 |
| 13.94 | 4 |
| 16.00 | 14 |
| 17.76 | 12 |
| 19.02 | 6 |
| 20.54 | 51 |
| 21.94 | 3 |
| 22.32 | 4 |
| 23.04 | 4 |
| 24.90 | 25 |
| 25.80 | 15 |
| 28.04 | 4 |
| 29.46 | 3 |
| 30.50 | 29 |
| 31.52 | 3 |
| 32.22 | 3 |
| 33.38 | 3 |
| 34.36 | 9 |
| 35.90 | 6 |
| 38.42 | 4 |
| 39.48 | 5.6 |

TABLE 6

| 2θ | Relative Intensity |
|---|---|
| 9.66 | 100 |
| 10.26 | 43 |
| 12.76 | 25 |
| 13.08 | 17 |
| 15.42 | 13 |
| 15.64 | 10 |
| 19.36 | 43 |
| 19.66 | 35 |
| 20.48 | 32 |
| 21.48 | 27 |

TABLE 6-continued

| 2θ | Relative Intensity |
|---|---|
| 22.60 | 15 |
| 22.78 | 18 |
| 24.08 | 16 |
| 24.30 | 41 |
| 24.78 | 16 |
| 25.64 | 26 |
| 26.30 | 18 |
| 26.70 | 22 |
| 27.36 | 15 |
| 28.02 | 54 |
| 29.08 | 40 |
| 29.50 | 13 |
| 30.64 | 25 |
| 30.88 | 73 |
| 31.74 | 38 |
| 32.26 | 25 |
| 32.98 | 33 |
| 33.54 | 15 |
| 35.38 | 15 |
| 36.26 | 16 |
| 36.94 | 11 |
| 38.24 | 13 |
| 39.74 | 11 |
| 39.84 | 11 |

EXAMPLE 2

Zeolite was produced under the same condition as in Example 1, for which, however, the template-containing zeolite that had been synthesized was calcined in nitrogen. Table 7 shows the data of XRD of the thus-obtained zeolite.

TABLE 7

| 2θ | Relative Intensity |
|---|---|
| 9.578 | 100 |
| 12.997 | 19.8 |
| 14.082 | 3.6 |
| 16.178 | 16.1 |
| 17.897 | 22.6 |
| 19.204 | 4.0 |
| 20.799 | 50.4 |
| 22.191 | 3.3 |
| 22.613 | 1.8 |
| 23.258 | 3.2 |
| 25.108 | 19.4 |
| 26.161 | 15.1 |
| 27.903 | 2.3 |
| 28.392 | 4.3 |
| 29.844 | 2.7 |
| 30.946 | 24.5 |
| 31.320 | 11.2 |
| 33.745 | 2.1 |
| 34.861 | 5.2 |
| 36.308 | 2.3 |
| 43.370 | 1.0 |
| 48.228 | 1.1 |
| 49.310 | 2.0 |

Figure 9:
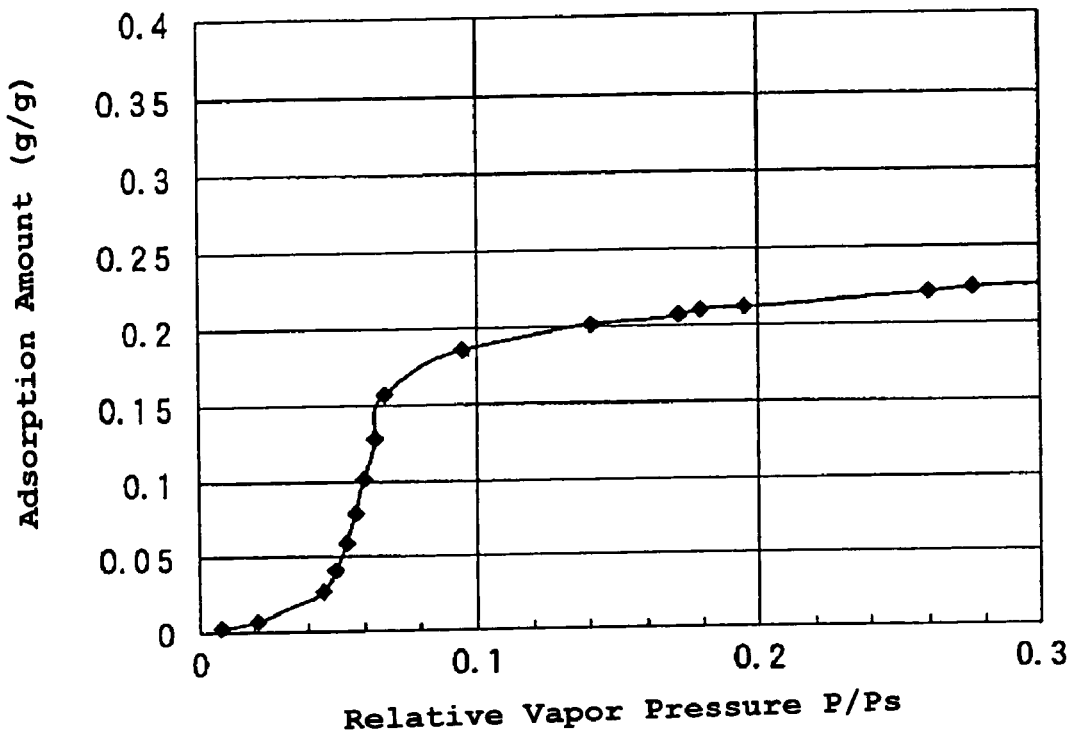
FIG. 9 is a water adsorption isotherm at 55° C. in Example 2.

FIG. 9 is a water vapor adsorption isotherm of the zeolite, measured at 55° C. by the use of an adsorption isothermometer (Bellsorb 18 by Nippon Bell). Concretely, the sample was analyzed under the following condition: The temperature of air in a thermostat is 60° C.; the adsorption temperature is 55° C.; the initial pressure is 3.0 Torr; the number of pressure set point is 0; the saturated vapor pressure is 118.11 mmHg; the equilibrium time is 500 seconds.

EXAMPLE 3

The sample calcined in nitrogen in Example 2 was re-calcined in air under the same condition as in Example 1. Table 8 shows the data of XRD of the thus-obtained zeolite. It is understood that the re-calcined zeolite is almost the same as the zeolite in Example 1.

TABLE 8

| 2θ | Relative Intensity |
|---|---|
| 9.547 | 100 |
| 10.157 | 58.1 |
| 12.753 | 22.9 |
| 15.605 | 5.5 |
| 16.983 | 6.2 |
| 19.453 | 52.5 |
| 20.399 | 29.8 |
| 21.339 | 14.7 |
| 22.752 | 10.6 |
| 24.383 | 34.2 |
| 25.631 | 6.9 |
| 26.076 | 4.0 |
| 26.697 | 16.3 |
| 27.181 | 4.2 |
| 27.948 | 22.0 |
| 29.252 | 22.6 |
| 30.646 | 46.0 |
| 31.616 | 17.8 |
| 32.485 | 12.7 |
| 32.952 | 20.5 |
| 33.701 | 3.8 |
| 34.173 | 2.6 |
| 35.113 | 4.9 |
| 36.548 | 7.7 |
| 38.222 | 3.0 |
| 39.574 | 4.1 |
| 40.232 | 1.8 |
| 41.619 | 2.8 |
| 42.752 | 2.9 |
| 43.597 | 2.0 |
| 46.258 | 3.7 |
| 48.499 | 3.6 |
| 49.143 | 4.4 |

EXAMPLE 4

Example 4 is to demonstrate FAPO-2 production by the use of morpholine alone as the template.

86.5 g of 85% phosphoric acid was added to 210 g of water. 51 g of pseudoboehmite (containing 25% water, manufactured by Condea) was gradually added thereto and stirred for 3 hours. A solution prepared by dissolving 41.7 g of ferrous sulfate 7-hydrate in 218 g of water was added to it, and 75.7 g of morpholine was gradually added thereto and further stirred for 3 hours. A gel-like, starting reaction product having the following composition was thus obtained.

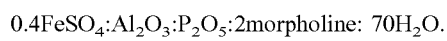

The thus-obtained mixture was fed into a 1-liter stainless autoclave with a Teflon (registered trade name) inner cylinder therein, and reacted at 180° C. for 24 hours while stirred at 100 rpm. After thus reacted, this was cooled, its supernatant was removed through decantation, and the deposit was recovered. Thus recovered, the deposit was washed three times with water, taken out through filtration, and then dried at 120° C. Thus obtained, the data of XRD of the zeolite are as in Table 9.

TABLE 9

| 2θ | Relative Intensity |
|---|---|
| 9.262 | 100 |
| 12.762 | 4.7 |
| 15.943 | 22.6 |
| 17.895 | 7.0 |
| 19.029 | 3.9 |
| 20.448 | 61.5 |
| 22.012 | 6.8 |
| 22.990 | 4.4 |
| 24.700 | 10.3 |
| 25.141 | 18.9 |
| 25.701 | 10.6 |
| 26.060 | 6.4 |
| 27.530 | 3.3 |
| 27.937 | 3.1 |
| 30.403 | 22.5 |
| 31.145 | 23.8 |
| 34.208 | 5.6 |
| 34.721 | 2.3 |
| 36.259 | 2.1 |
| 38.609 | 2.1 |
| 39.571 | 1.5 |
| 42.948 | 2.7 |
| 44.962 | 1.5 |
| 47.384 | 1.5 |
| 48.802 | 4.9 |

This was calcined in air under the same condition as in Example 1. Table 10 shows the data of XRD of the thus-obtained zeolite.

TABLE 10

| 2θ | Relative Intensity |
|---|---|
| 9.494 | 100 |
| 10.104 | 52.5 |
| 12.237 | 4.8 |
| 12.845 | 17.5 |
| 15.234 | 3.0 |
| 15.713 | 2.8 |
| 16.850 | 4.4 |
| 19.309 | 46.5 |
| 20.386 | 28.1 |
| 21.211 | 10.2 |
| 22.167 | 3.7 |
| 22.665 | 7.8 |
| 23.596 | 5.2 |
| 24.539 | 23.7 |
| 25.744 | 6.6 |
| 26.303 | 16.2 |
| 27.513 | 10.9 |
| 28.317 | 2.8 |
| 28.703 | 7.3 |
| 29.348 | 14.3 |
| 30.593 | 35.6 |
| 31.243 | 9.0 |
| 32.507 | 5.8 |
| 33.039 | 17.1 |
| 33.396 | 7.8 |
| 33.989 | 2.8 |
| 34.817 | 3.9 |
| 36.439 | 4.2 |
| 36.880 | 2.0 |
| 38.837 | 2.0 |
| 39.499 | 2.7 |
| 40.165 | 2.1 |
| 41.698 | 2.6 |
| 48.393 | 3.0 |
| 48.849 | 5.6 |

This sample was subjected to ICP for elementary analysis in the same manner as in Example 1. This confirmed that the constitutional ratio (by mol) of each element to the total of all constituent elements, aluminium, phosphorus and iron of the zeolite obtained herein is as follows: Iron accounts for 17.2%, aluminium for 29.4%, and phosphorus for 53.4%

Figure 10:
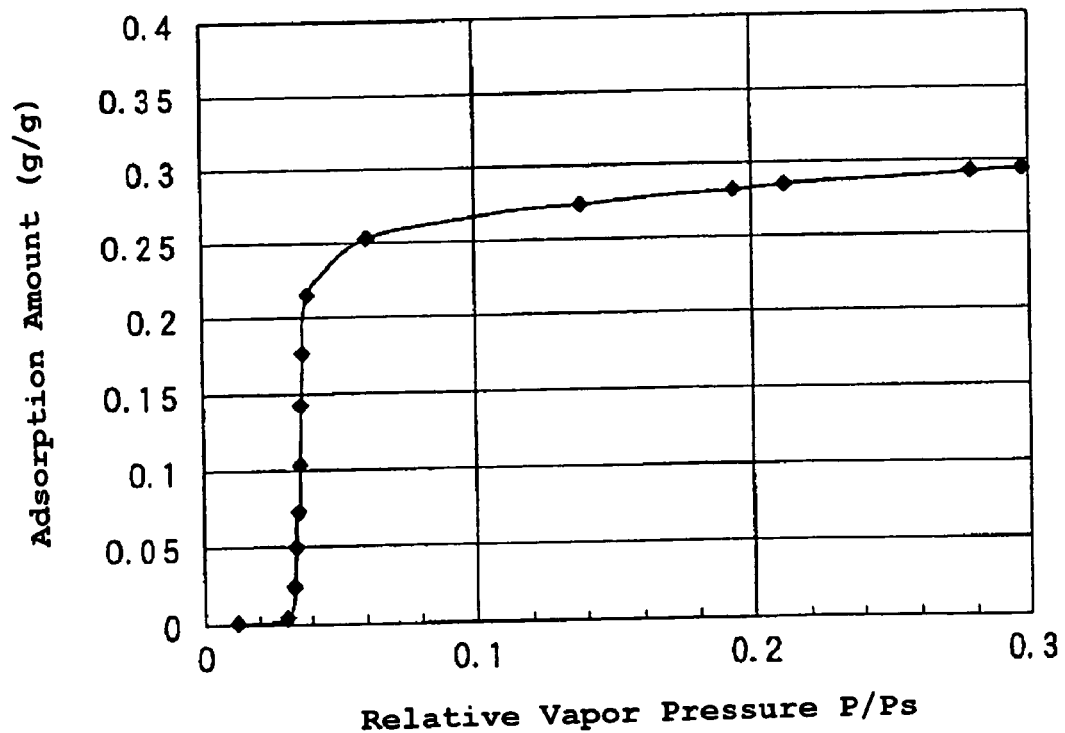
FIG. 10 is a water adsorption isotherm at 55° C. in Example 4.

Further, the zeolite was analyzed by the use of an adsorption isothermometer (Bellsorb 18 by Nippon Bell) under the same condition as in Example 1. FIG. 10 shows the water vapor absorption isotherm at 55° C. of the zeolite.

EXAMPLE 5

Example 5 is to demonstrate FAPO-2 production by the use of morpholine and triethylamine as the template.

11.5 g of 85% phosphoric acid was added to 28.05 g of water. 6.8 g of pseudoboehmite (containing 25% water, manufactured by Condea) was gradually added thereto and stirred for 3 hours. A solution prepared by dissolving 8.3 g of ferrous sulfate 7-hydrate in 29 g of water was added to it, and 5.05 g of morpholine and 4.35 g of triethylamine were gradually added thereto and further stirred for 3 hours. A gel-like, starting reaction product having the following composition was thus obtained.

0.6FeSO$_4$:Al$_2$O$_3$:P$_2$O$_5$:1.16morpholine: 0.86triethylamine:70H$_2$O.

The thus-obtained mixture was fed into a 0.2-liter stainless autoclave with a Teflon (registered trade name) inner cylinder therein, and reacted at 160° C. for 4 days while kept static. After thus reacted, this was cooled, its supernatant was removed through decantation, and the deposit was recovered. Thus recovered, the deposit was washed three times with water, taken out through filtration, and then dried at 120° C. Thus obtained, the data of XRD of the zeolite are as in Table 11.

TABLE 11

| 2θ | Relative Intensity |
|---|---|
| 9.481 | 100 |
| 12.892 | 13.3 |
| 13.934 | 5.6 |
| 16.042 | 31.2 |
| 17.687 | 10.2 |
| 19.038 | 3.1 |
| 20.649 | 75.7 |
| 21.128 | 4.3 |
| 21.984 | 4.8 |
| 22.408 | 7.1 |
| 23.082 | 4.9 |
| 24.580 | 1.7 |
| 24.848 | 27.7 |
| 26.004 | 16.2 |
| 27.751 | 3.6 |
| 28.101 | 4.3 |
| 29.621 | 3.8 |
| 30.709 | 32.2 |
| 31.050 | 20.9 |
| 32.462 | 1.7 |
| 33.441 | 3.7 |
| 34.649 | 7.4 |
| 35.091 | 0.9 |
| 35.994 | 3.9 |
| 39.858 | 2.4 |
| 42.809 | 2.5 |
| 43.551 | 1.6 |
| 45.204 | 0.8 |
| 47.899 | 2.4 |
| 48.985 | 4.4 |

This was calcined in air under the same condition as in Example 1. Table 12 shows the data of XRD of the thus-obtained zeolite.

TABLE 12

| 2θ | Relative Intensity |
| --- | --- |
| 9.587 | 100 |
| 10.190 | 49.0 |
| 12.743 | 13.3 |
| 12.990 | 10.6 |
| 14.888 | 1.6 |
| 15.297 | 2.7 |
| 15.601 | 4.5 |
| 17.001 | 3.2 |
| 19.401 | 31.2 |
| 19.697 | 33.1 |
| 20.447 | 20.4 |
| 21.382 | 10.4 |
| 22.516 | 5.5 |
| 22.761 | 6.6 |
| 24.353 | 26.6 |
| 24.751 | 3.9 |
| 26.127 | 3.8 |
| 26.756 | 8.7 |
| 28.033 | 11.8 |
| 28.956 | 6.0 |
| 29.239 | 15.7 |
| 30.694 | 34.5 |
| 31.079 | 2.5 |
| 31.701 | 12.1 |
| 32.416 | 2.0 |
| 32.990 | 13.3 |
| 33.108 | 2.7 |
| 34.165 | 2.0 |
| 35.242 | 2.4 |
| 36.638 | 2.6 |
| 36.910 | 4.0 |
| 38.236 | 3.2 |
| 39.621 | 2.6 |
| 40.298 | 1.9 |
| 41.552 | 2.0 |
| 42.834 | 2.0 |
| 43.540 | 1.8 |
| 46.248 | 1.6 |
| 48.537 | 2.1 |
| 49.215 | 2.6 |
| 49.493 | 1.8 |

This sample was subjected to ICP for elementary analysis in the same manner as in Example 1. This confirmed that the constitutional ratio (by mol) of each element to the total of all constituent elements, aluminium, phosphorus and iron of the zeolite obtained herein is as follows: Iron accounts for 13.2%, aluminium for 38.3%, and phosphorus for 48.5%

Figure 11:
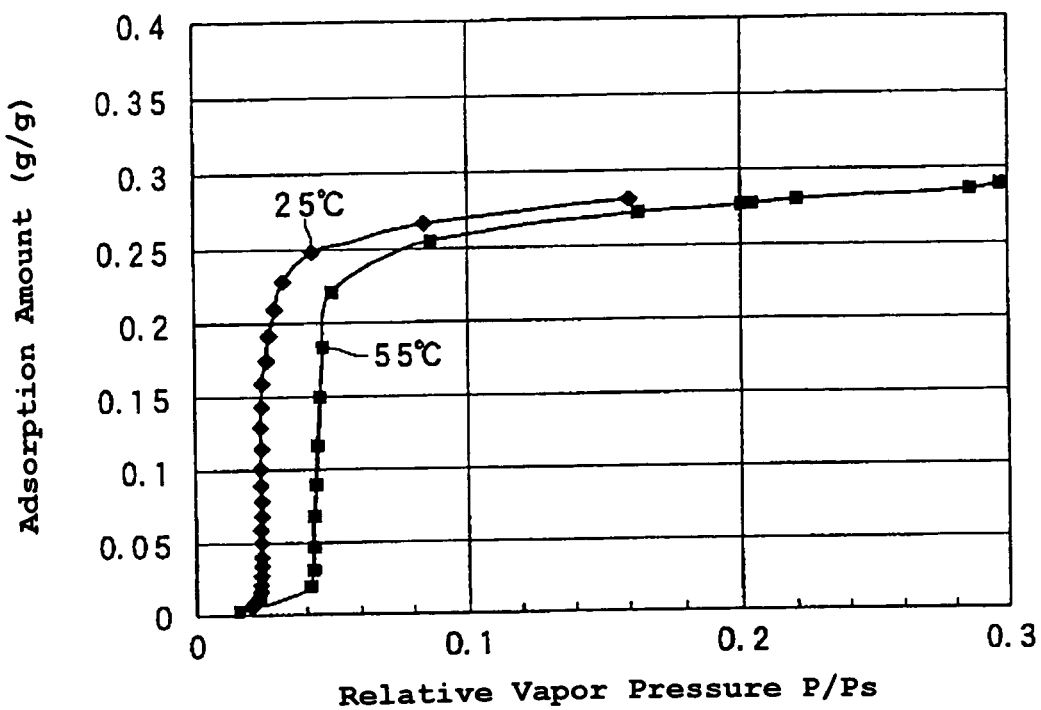
FIG. 11 shows water adsorption isotherms at 55° C. and at 25° C. in Example 5.

FIG. 11 shows a water vapor adsorption isotherm of the zeolite, measured at 55° C. or at 25° C. under the same condition as in Example 1, by the use of an adsorption isothermometer (Bellsorb 18 by Nippon Bell). Concretely, the condition for the sample analysis is as follows: The temperature of air in a thermostat is 50° C.; the adsorption temperature is 25° C.; the initial pressure is 3.0 Torr; the number of pressure set point is 0; the saturated vapor pressure is 23.76 mmHg; the equilibrium time is 500 seconds.

EXAMPLE 6

Example 6 is to demonstrate FAPO-2 production by the use of morpholine and cyclohexylamine as the template.

11.5 g of 85% phosphoric acid was added to 26 g of water. 5.44 g of pseudoboehmite (containing 25% water, manufactured by Condea) was gradually added thereto and stirred for 2 hours. A solution prepared by dissolving 8.3 g of ferrous sulfate 7-hydrate in 26 g of water was added to it, and a mixture of 2.18 g of morpholine and 7.43 g of cyclohexylamine was gradually added thereto and further stirred for 2 hours. A gel-like, starting reaction product having the following composition was thus obtained.

$0.6FeSO_4:0.8Al_2O_3:P_2O_5:0.5$morpholine:$1.5$cyclohexylamine: $6$ $OH_2O$.

The thus-obtained mixture was fed into a 0.2-liter stainless autoclave with a Teflon (registered trade name) inner cylinder therein, and reacted at 190° C. for one day while kept static. After thus reacted, this was cooled, its supernatant was removed through decantation, and the deposit was recovered. Thus recovered, the deposit was washed three times with water, taken out through filtration, and then dried at 120° C. Thus obtained, the data of XRD of the zeolite are as in Table 13.

TABLE 13

| 2θ | Relative Intensity |
| --- | --- |
| 9.398 | 55.8 |
| 12.926 | 1.6 |
| 13.726 | 2.8 |
| 16.036 | 39.5 |
| 16.969 | 1.5 |
| 17.392 | 4.4 |
| 18.910 | 7.1 |
| 20.651 | 87.3 |
| 21.740 | 19.5 |
| 22.493 | 6.2 |
| 23.006 | 8.1 |
| 24.499 | 86.3 |
| 26.046 | 18.2 |
| 27.757 | 11.9 |
| 29.579 | 3.9 |
| 30.204 | 23.8 |
| 30.749 | 100 |
| 32.411 | 2.8 |
| 33.003 | 6.6 |
| 34.687 | 3.8 |
| 35.567 | 9.3 |
| 38.456 | 3.4 |
| 39.119 | 2.0 |
| 39.877 | 2.1 |
| 42.494 | 4.0 |
| 43.510 | 2.2 |
| 44.389 | 1.3 |
| 45.945 | 1.2 |
| 47.057 | 1.2 |
| 47.961 | 5.2 |
| 48.645 | 5.9 |

This was calcined in air under the same condition as in Example 1. The following Table shows the data of XRD of the thus-obtained zeolite.

TABLE 14

| 2θ | Relative Intensity |
| --- | --- |
| 9.585 | 100 |
| 10.152 | 66.7 |
| 12.734 | 8.0 |
| 15.407 | 3.7 |
| 17.024 | 1.8 |
| 19.301 | 19.4 |
| 19.695 | 31.2 |
| 20.447 | 14.1 |
| 21.370 | 6.9 |
| 22.606 | 5.3 |
| 24.204 | 13.5 |
| 24.774 | 4.7 |
| 25.552 | 4.5 |
| 26.188 | 2.9 |
| 26.813 | 7.1 |

TABLE 14-continued

| 2θ | Relative Intensity |
| --- | --- |
| 27.322 | 2.0 |
| 28.038 | 16.2 |
| 29.009 | 11.3 |
| 30.749 | 16.6 |
| 31.711 | 10.9 |
| 32.238 | 4.9 |
| 32.905 | 6.7 |
| 33.664 | 3.3 |
| 35.303 | 1.8 |
| 36.182 | 1.3 |
| 37.053 | 2.3 |
| 38.065 | 1.7 |
| 39.016 | 1.2 |
| 39.705 | 1.6 |
| 40.171 | 1.4 |
| 41.528 | 1.9 |
| 42.773 | 2.3 |
| 45.900 | 1.3 |
| 48.654 | 1.6 |
| 49.350 | 2.6 |

This sample was subjected to ICP for elementary analysis in the same manner as in Example 1. This confirmed that the constitutional ratio (by mol) of each element to the total of all constituent elements, aluminium, phosphorus and iron of the zeolite obtained herein is as follows: Iron accounts for 14.1%, aluminium for 38.4%, and phosphorus for 47.4%

Figure 12:
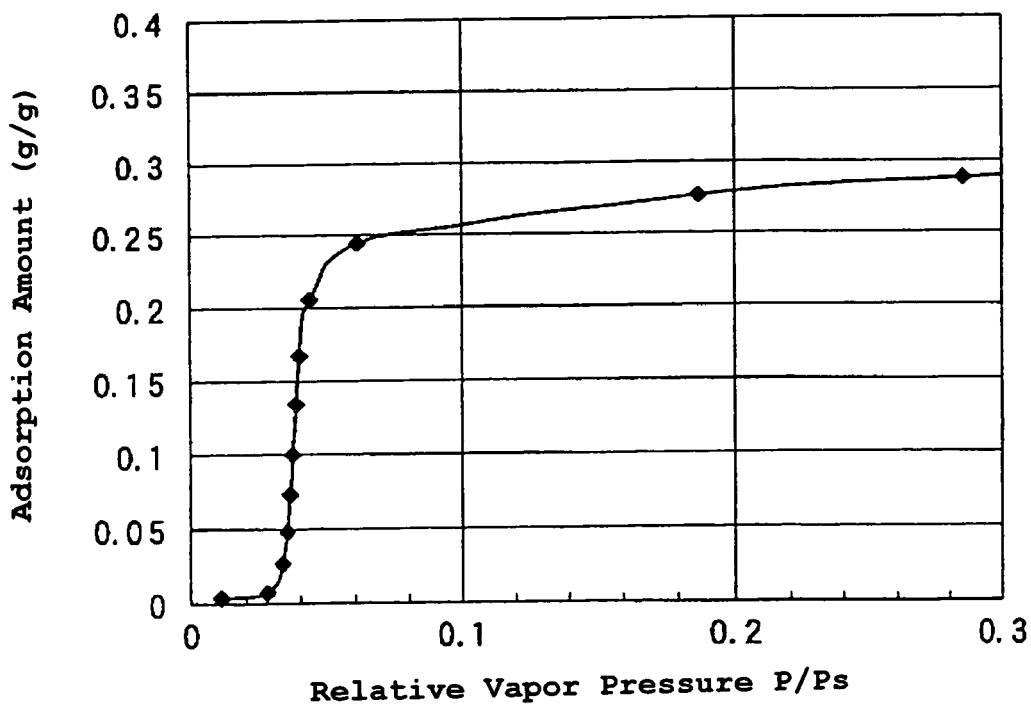
FIG. 12 is a water adsorption isotherm at 55° C. in Example 6.

FIG. 12 is a water vapor adsorption isotherm of the zeolite, measured at 55° C. under the same condition as in Example 1, by the use of an adsorption isothermometer (Bellsorb 18 by Nippon Bell).

EXAMPLE 7

Example 7 is to demonstrate Si-containing FAPO-2 production by the use of morpholine and triethylamine as the template.

11.5 g of 85% phosphoric acid was added to 28.05 g of water. 6.8 g of pseudoboehmite (containing 25% water, manufactured by Condea) was gradually added thereto and stirred for 3 hours. A liquid prepared by dissolving 2.78 g of ferrous sulfate 7-hydrate in 29 g of water and adding 0.15 g of fumed silica (Aerosil 200) thereto was added to it, and a mixture of 5.05 g of morpholine and 4.35 g of triethylamine was gradually added thereto and further stirred for 3 hours. A gel-like, starting reaction product having the following composition was thus obtained.

$0.2FeSO_4:0.05SiO_2:Al_2O_3:P_2O_5:1.16morpholine:0.86-triethylamine:70H_2O$.

The thus-obtained mixture was fed into a 0.2-liter stainless autoclave with a Teflon (registered trade name) inner cylinder therein, and reacted at 170° C. for 2 days while kept static. After thus reacted, this was cooled, its supernatant was removed through decantation, and the deposit was recovered. Thus recovered, the deposit was washed three times with water, taken out through filtration, and then dried at 120° C. Thus obtained, the data of XRD of the zeolite are as in Table 15.

TABLE 15

| 2θ | Relative Intensity |
| --- | --- |
| 9.477 | 78.0 |
| 12.874 | 15.0 |
| 13.937 | 7.3 |
| 15.996 | 37.2 |

TABLE 15-continued

| 2θ | Relative Intensity |
| --- | --- |
| 16.723 | 1.0 |
| 17.730 | 21.9 |
| 19.013 | 4.2 |
| 20.589 | 100.0 |
| 21.952 | 9.0 |
| 22.388 | 5.1 |
| 23.039 | 9.5 |
| 24.887 | 46.4 |
| 25.934 | 20.7 |
| 27.684 | 5.7 |
| 28.104 | 5.1 |
| 30.645 | 46.6 |
| 31.007 | 22.9 |
| 31.596 | 2.6 |
| 32.383 | 1.7 |
| 33.403 | 4.9 |
| 34.541 | 9.5 |
| 35.989 | 6.3 |
| 38.557 | 1.4 |
| 39.712 | 3.4 |
| 42.800 | 3.9 |
| 43.462 | 2.6 |
| 46.998 | 1.0 |
| 47.736 | 3.0 |
| 48.853 | 3.9 |

This was calcined in air under the same condition as in Example 1. Table 16 shows the data of XRD of the thus-obtained zeolite.

TABLE 16

| 2θ | Relative Intensity |
| --- | --- |
| 9.499 | 100 |
| 10.092 | 33.8 |
| 12.984 | 17.1 |
| 15.291 | 3.6 |
| 16.131 | 3.8 |
| 16.952 | 3.0 |
| 17.917 | 4.4 |
| 19.492 | 32.5 |
| 20.450 | 15.4 |
| 22.834 | 4.6 |
| 24.242 | 13.6 |
| 25.155 | 3.4 |
| 26.181 | 5.4 |
| 26.612 | 8.8 |
| 27.803 | 12.2 |
| 29.055 | 10.0 |
| 30.796 | 24.0 |
| 31.584 | 9.5 |
| 32.861 | 9.4 |
| 36.761 | 2.9 |
| 39.796 | 3.2 |
| 42.457 | 1.6 |
| 49.195 | 3.1 |

This sample was subjected to ICP for elementary analysis in the same manner as in Example 1. This confirmed that the constitutional ratio (by mol) of each element to the total of all constituent elements, aluminium, phosphorus, iron and silicon of the zeolite obtained herein is as follows: Iron accounts for 9.9%, silicon for 2.8%, aluminium for 40.7%, and phosphorus for 46.7%

Figure 13:
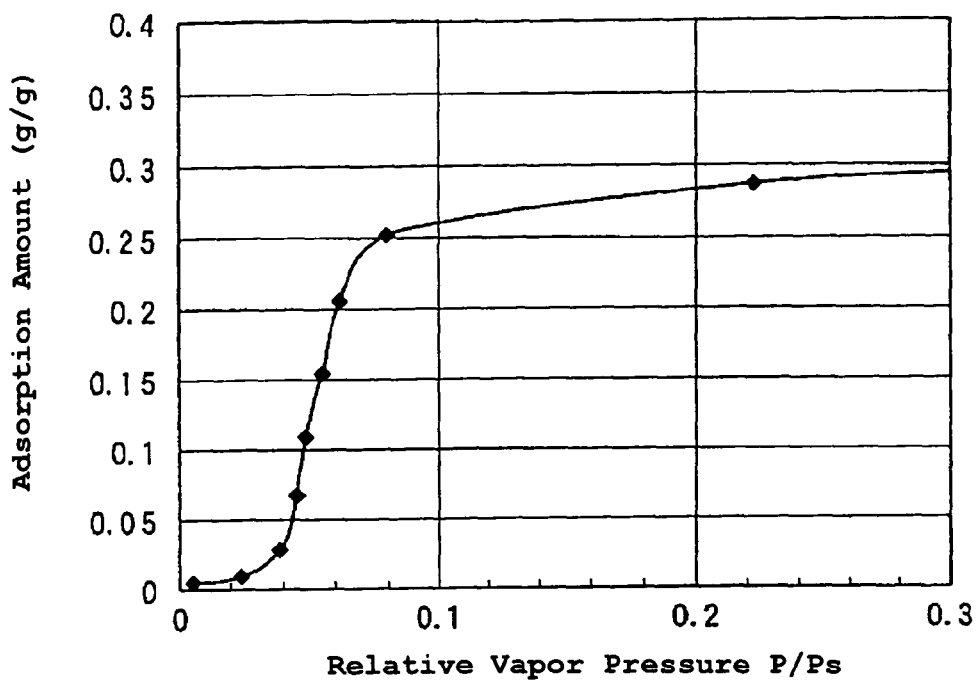
FIG. 13 is a water adsorption isotherm at 55° C. in Example 7.

FIG. 13 is a water vapor adsorption isotherm of the zeolite, measured at 55° C. under the same condition as in Example 1, by the use of an adsorption isothermometer (Bellsorb 18 by Nippon Bell).

Each of the zeolites obtained in Examples 1 to 7 above was one of the CHA-type (having a framework density of 14.5 T/nm³).

EXAMPLE 8

Example 8 is to demonstrate AEI-type FAPO production by the use of diisopropylethylamine and methylbutylamine as the template. 8.07 g of 85 % phosphoric acid was added to 15 g of water. 3.8 g of pseudoboehmite (containing 25 % water, manufactured by Condea) was gradually added thereto and stirred for 3 hours. A solution prepared by dissolving 3.88 g of ferrous sulfate 7-hydrate in 20 g of water was added to it, and a mixture of 4.55 g of diisopropylethylamine and 3.05 g of methylbutylamine was gradually added thereto and further stirred for 3 hours. A gel-like, starting reaction product having the following composition was thus obtained.

4FeSO$_4$:0.8Al$_2$O$_3$:P$_2$O$_5$:1diisopropylethylamine:1-methylbutylamine:60H$_2$O.

The thus-obtained mixture was fed into a 0.2-liter stainless autoclave with a Teflon (registered trade name) inner cylinder therein, and reacted at 170° C. for 2 days while kept static. After thus reacted, this was cooled, its supernatant was removed through decantation, and the deposit was recovered. Thus recovered, the deposit was washed three times with water, taken out through filtration, and then dried at 120° C.

Thus obtained, the zeolite was calcined in air at 550° C. It was identified as AEI-type zeolite (having a framework density of 14.8 T/nm³) by the data of its XRD. This sample was subjected to ICP for elementary analysis in the same manner as in Example 1. This confirmed that the constitutional ratio (by mol) of each element to the total of all constituent elements, aluminium, phosphorus and iron of the zeolite obtained herein is as follows: Iron accounts for 9.2%, aluminium for 42.6%, and phosphorus for 48.2%

Figure 14:
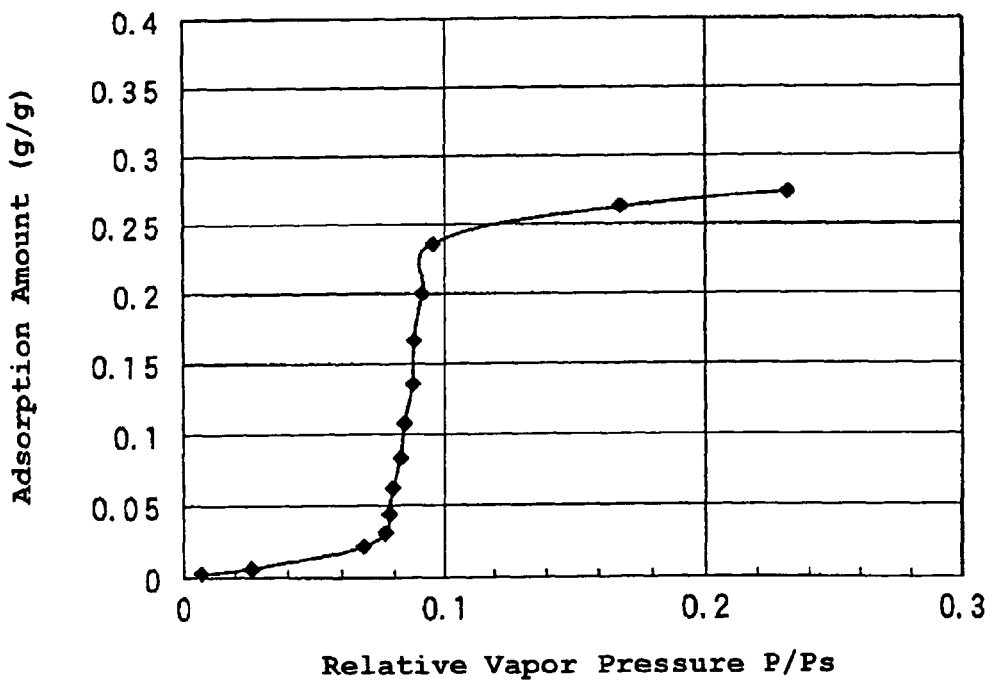
FIG. 14 is a water adsorption isotherm at 55° C. in Example 8.

FIG. 14 is a water vapor adsorption isotherm of the zeolite, measured at 55° C. under the same condition as in Example 1, by the use of an adsorption isothermometer (Bellsorb 18 by Nippon Bell).

EXAMPLE 9

Example 9 is to demonstrate CHA-type, Si-containing FAPO production by the use of morpholine and triethylamine as the template.

11.5 g of 85% phosphoric acid was added to 28.05 g of water. 6.8 g of pseudoboehmite (containing 25% water, manufactured by Condea) was gradually added thereto and stirred for 3 hours. A liquid prepared by dissolving 1.4 g of ferrous sulfate 7-hydrate in 29 g of water and adding 0.3 g of fumed silica (Aerosil 200) thereto was added to it, and a mixture of 5.05 g of morpholine and 4.35 g of triethylamine was gradually added thereto and further stirred for 3 hours. A gel-like, starting reaction product having the following composition was thus obtained.

0.1FeSO$_4$:0.1SiO$_2$:Al$_2$O$_3$:P$_2$O$_5$:1.16morpholine:0.86-triethylamine:70H$_2$O.

The thus-obtained mixture was fed into a 0.2-liter stainless autoclave with a Teflon (registered trade name) inner cylinder therein, and reacted at 160° C. for 3 days while kept static. After thus reacted, this was cooled, its supernatant was removed through decantation, and the deposit was recovered. Thus recovered, the deposit was washed three times with water, taken out through filtration, and then dried at 120° C.

Thus obtained, the zeolite was calcined in air at 550° C. It was identified as CHA-type zeolite (having a framework density of 14.5 T/nm³) by the data of its XRD. This sample was subjected to ICP for elementary analysis in the same manner as in Example 1. This confirmed that the constitutional ratio (by mol) of each element to the total of the constituent elements, aluminium, phosphorus and iron of the zeolite obtained herein is as follows: Iron accounts for 6.6%, silicon for 4.6%, aluminium for 43.6%, and phosphorus for 43.6%

Figure 15:
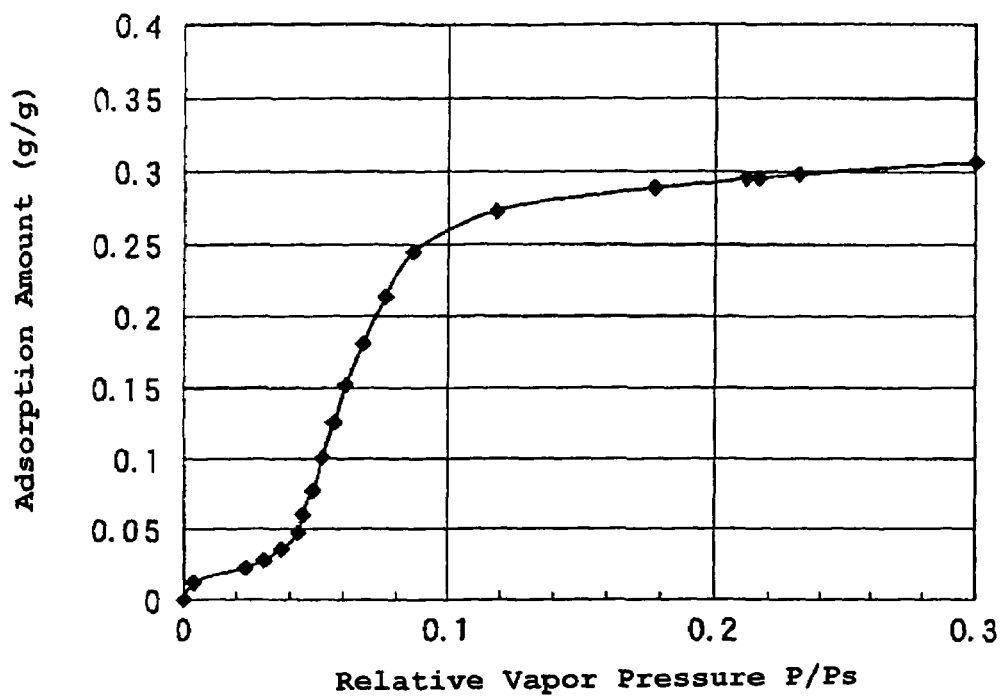
FIG. 15 is a water adsorption isotherm at 55° C. in Example 9.

FIG. 15 is a water vapor adsorption isotherm of the zeolite, measured at 55° C. under the same condition as in Example 1, by the use of an adsorption isothermometer (Bellsorb 18 by Nippon Bell).

EXAMPLE 10

Example 10 is to demonstrate CHA-type, high-Si SAPO production by the use of cyclohexylamine as the template.

11.5 g of 85% phosphoric acid was added to 28.05 g of water. 6.8 g of pseudoboehmite (containing 25% water, manufactured by Condea) was gradually added thereto and stirred for 3 hours. A liquid prepared by mixing 3 g of fumed silica (Aerosil 200) with 22 g of water was added to it, and 9.9 g of cyclohexylamine was gradually added thereto and further stirred for 2 hours. A gel-like, starting reaction product having the following composition was thus obtained.

SiO$_2$:Al$_2$O$_3$:P$_2$O$_5$:2cyclohexylamine:60H$_2$O.

The thus-obtained mixture was fed into a 0.2-liter stainless autoclave with a Teflon (registered trade name) inner cylinder therein, and reacted at 200° C. for one day while kept static. After thus reacted, this was cooled, its supernatant was removed through decantation, and the deposit was recovered. Thus recovered, the deposit was washed three times with water, taken out through filtration, and then dried at 120° C.

Thus obtained, the zeolite was calcined in air at 550° C. It was identified as CHA-type zeolite by the data of its XRD. This sample was subjected to ICP for elementary analysis in the same manner as in Example 1. This confirmed that the constitutional ratio (by mol) of each element to the total of the constituent elements, aluminium, phosphorus and silicon of the zeolite obtained herein is as follows: Silicon accounts for 12.0%, aluminium for 49.2%, and phosphorus for 38.9%

Figure 16:
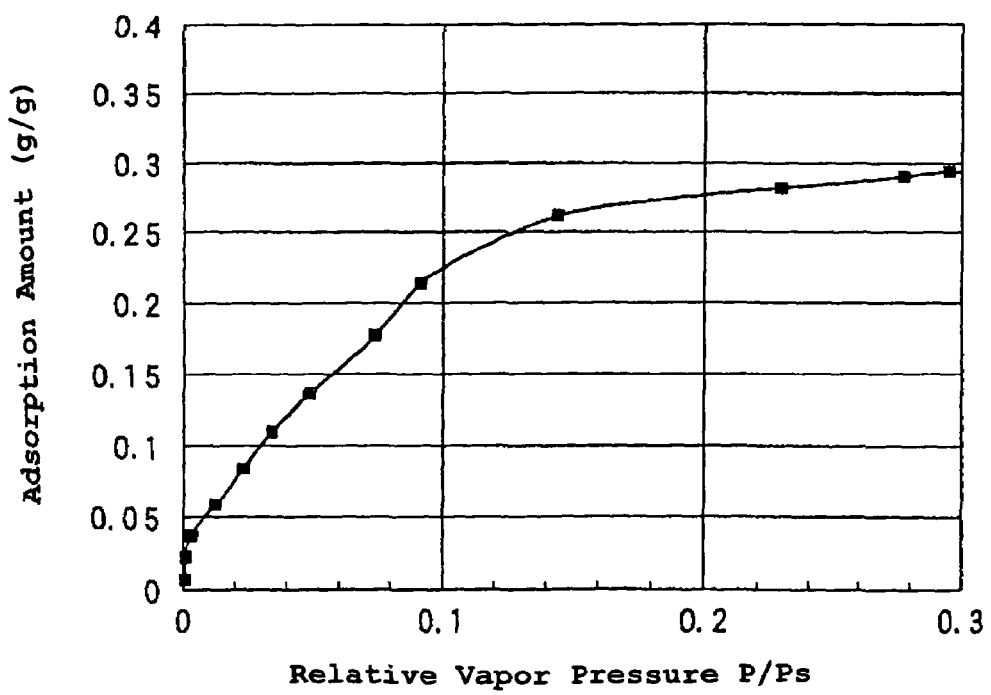
FIG. 16 is a water adsorption isotherm at 55° C. in Example 10.

FIG. 16 is a water vapor adsorption isotherm of the zeolite, measured at 55° C. under the same condition as in Example 1, by the use of an adsorption isothermometer (Bellsorb 18 by Nippon Bell). The heat of water adsorption of the zeolite was 64 kJ/mol.

Comparative Example 1

Figure 17:
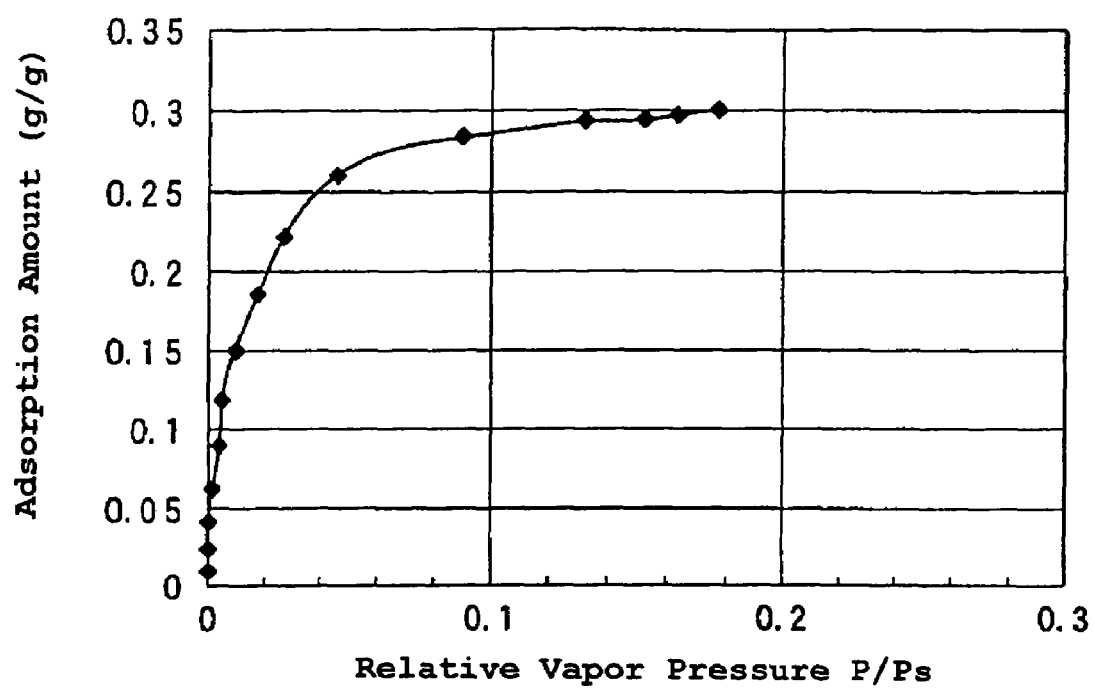
FIG. 17 is a water adsorption isotherm at 55° C. in Comparative Example 1.

Comparative Example 1 is an ordinary Y-type zeolite, Toso's Y-type Zeolite, 320NAA (having a silica/alumina ratio of 5.5). FIG. 17 is a water vapor adsorption isotherm of this zeolite, measured at 55° C. under the same condition as in Example 1, by the use of an adsorption isothermometer (Bellsorb 18 by Nippon Bell).

EXAMPLE 11

3.7 g of sodium hydroxide was dissolved in 26 g of water, to which was added 5.4 g of sodium aluminate and stirred for 1 hour. 30 g of silica sol (Nissan Chemical's Snowtex 40) and 10 g of water were added to it, and further stirred for 7 hours. Stirring it was stopped and this was kept overnight as such. Then, this was fed into an autoclave with a Teflon inner cylinder therein, and heated in an oven at 100° C. for one day. After thus heated, this was cooled and then taken out of the autoclave, and the supernatant was removed through decantation. The resulting deposit was recovered. This was washed three times with water, taken out through filtration, and then dried at 120° C. This was identified as FAU-type (Y-type) zeolite by the data of its XRD. Next, a solution prepared by dissolving 8.8 g of zinc acetate 2-hydrate in 40 g of water was put into a flask, and 2 g of the zeolite obtained herein was added to it. This was heated at 80° C. for 2 hours and filtered, and the resulting residue was washed with water. The washing operation was repeated two times. Thus obtained, the produce was dried at 120° C., and then calcined in air at 500° C. for 2 hours. Its elementary analysis confirmed that the ratio of silica/alumina in the product is 6.4 (Si/Al=3.2), and the ratio of Zn/Al therein is 0.4 (all by mol).

Figure 18:
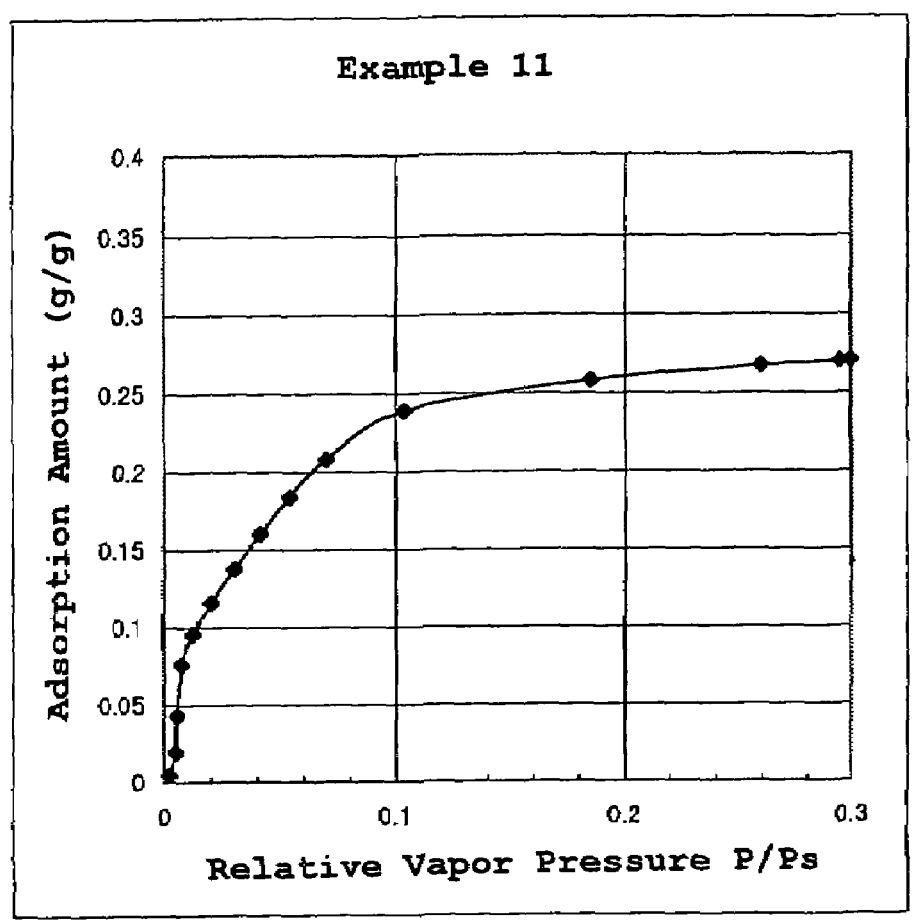
FIG. 18 is a water adsorption isotherm at 55° C. in Example 11.

FIG. 18 is a water vapor adsorption isotherm of the zeolite, measured at 55° C. under the same condition as in Example 1, by the use of an adsorption isothermometer (Bellsorb 18 by Nippon Bell).

are that much waste heat that is generated by vehicles can be efficiently utilized by the use of the adsorbent in vehicles, and, in addition, the fuel efficiency reduction to be caused by the operation of air conditioners in vehicles may be prevented.

The regenerator system of the invention comprises the adsorbent of the invention that has the specific adsorption-desorption capabilities as above, and this is favorable for effectively utilizing much waste heat to be generated by vehicles and can solve the problem of the fuel efficiency reduction to be caused by the operation of air conditioners in vehicles. Still another advantage of the regenerator system is that it may be down-sized not lowering the system efficiency thereof. In particular, automobiles equipped with the regenerator system of the invention that is so designed that the latent heat of vaporization is supplied to a coolant medium that circulates in an air conditioner fitted thereto are effective in that the air conditioner (cooler) could be driven even when the engine is stopped while waiting for the traffic signals to change.

The invention also provides a ferroaluminophosphate and its production method. Comprising the ferroaluminophos-

TABLE 17

| | Adsorption Amount (g/g) | | | Adsorption Amount Change (g/g) | | Composition (molar ratio, %) | | | |
|---|---|---|---|---|---|---|---|---|---|
| | Value of P/Ps | | | Range of P/Ps | | FAPO | FSAPO | SAPO | Framework |
| | 0.02 | 0.08 | 0.1 | 0.02–0.1*[1] | 0.02–0.08*[2] | Fe/Al/P | Fe/Si/Al/P | Si/Al/P | Density (nm$^3$) |
| Example 1 | 0.00 | 0.26 | 0.27 | 0.24 | 0.22 | 13.8/37.4/48.8 | — | — | 14.5 |
| Example 2 | 0.01 | 0.17 | 0.19 | 0.15 | 0.13 | 13.8/37.4/48.8 | — | — | 14.5 |
| Example 3 | — | — | — | — | — | 13.8/37.4/48.8 | — | — | — |
| Example 4 | 0.00 | 0.26 | 0.27 | 0.26 | 0.23 | 17.2/29.4/53.4 | — | — | 14.5 |
| Example 5 | 0.00 | 0.26 | 0.27 | 0.26 | 0.23 | 13.2/38.3/48.5 | — | — | 14.5 |
| Example 6 | 0.00 | 0.25 | 0.26 | 0.24 | 0.22 | 14.1/38.4/47.4 | — | — | 14.5 |
| Example 7 | 0.01 | 0.25 | 0.26 | 0.23 | 0.17 | — | 9.9/2.8/40.7/46.7 | — | 14.5 |
| Example 8 | 0.01 | 0.06 | 0.24 | 0.22 | 0.02 | 9.2/42.6/48.2 | — | — | 14.8 |
| Example 9 | 0.02 | 0.22 | 0.26 | 0.20 | 0.10 | — | 6.6/4.6/43.6/43.6 | — | 14.5 |
| Example 10 | 0.07 | 0.18 | 0.22 | 0.08 | 0.03 | — | — | 12.0/49.2/38.9 | 14.5 |
| Comp. Ex. 1 | 0.02 | 0.27 | 0.28 | 0.07 | 0.05 | — | — | — | 12.7 |

*[1]when the value of P/Ps changes by 0.05
*[2]when the value of P/Ps changes by 0.02

As described in detail with reference to its preferred embodiments, the adsorbent for regeneration systems of the invention has good adsorption-desorption capabilities in that its desorption capability is good even under heating condition at relatively low temperature and its adsorption capability is good even under cooling condition at relatively high temperatures. In addition, the adsorbent of the invention ensures a significant adsorption amount difference even though the difference between the heating temperature and the cooling temperature is small, and therefore it attains good and efficient adsorption/desorption cycles. In particular, when the adsorbent is applied to regenerator systems for vehicles, the waste heat from internal combustion engines in vehicles can be effectively utilized in the adsorption-desorption process of the adsorbent. Concretely, for example, the heat that is generated while the adsorbent adsorbs an adsorbate can be supplied to the devices in vehicles to be warmed up therein; and the latent heat of vaporization of the adsorbate that is generated by the adsorbate to vaporize to be adsorbed by the adsorbent can be supplied to the coolant medium that circulates in a vapor compression-type refrigerator in air conditioners mounted on vehicles. Accordingly, the significant advantages of the adsorbent of the invention phate, the adsorbent of the invention is stable and is hardly broken, and it can be efficiently produced in a relatively simplified manner.

While the invention has been described in detail and with reference to specific embodiments thereof, it will be apparent to one skilled in the art that various changes and modifications can be made therein without departing from the scope thereof.

This application is based on Japanese patent application No. 2002-236882 filed Aug. 15, 2002, the entire contents thereof being hereby incorporated by reference.

What is claimed is:

1. A heat utilization system of utilizing the heat of adsorption generated while an adsorbent adsorbs an adsorbate and/or the latent heat of vaporization generated while the adsorbate vaporizes and is adsorbed to the adsorbent, wherein the adsorbent is zeolite, and (a) the framework density of the zeolite falls between 10 T/nm$^3$ and 18 T/nm$^3$, and (b) on the adsorption isotherm thereof measured at 55° C., the adsorbate adsorption amount by the zeolite is at most 0.12 g/g at a relative vapor pressure of 0.02 and is at least 0.13 g/g at a relative vapor pressure of 0.1, and the zeolite has a relative vapor pressure region to give an adsorbate adsorption amount change of at least 0.08 g/g when the relative vapor pressure thereof has changed by 0.05 in a range of the relative vapor pressure thereof of from 0.02 to 0.1.

2. The heat utilization system as claimed in claim 1, wherein the adsorbate adsorption amount is at most 0.1 g/g at a relative vapor pressure of 0.02, and is at least 0.15 g/g at a relative vapor pressure of 0.1.

3. The heat utilization system as claimed in claim 1 which is mounted on vehicles, wherein the waste heat generated by the warmed-up internal combustion engine is supplied to the adsorbent, the internal combustion engine is warmed up by the heat of adsorption of the adsorbent, and the latent heat of vaporization from the adsorbent is utilized in the vapor compression-type refrigerator for cooling.

4. The heat utilization system as claimed in claim 1, wherein the adsorbate is water.

5. A regenerator system which is (1) for feeding waste heat to an adsorbent so as to desorb the adsorbate from it and to feed the heat that is generated while the adsorbent adsorbs the adsorbate, to the devices to be warmed up, and/or (2) for feeding waste heat to an adsorbent so as to desorb the adsorbate from it and to feed the latent heat of vaporization generated while the adsorbate vaporizes and is adsorbed to the adsorbent, to the cooling medium that circulates inside a refrigerator for cooling, wherein the adsorbent is zeolite, and (a) a framework density of the zeolite falls between 10 T/nm$^3$ and 18 T/nm$^3$, and, (b) on the adsorption isotherm thereof measured at 55° C., the adsorbate adsorption amount by the zeolite is at most 0.12 g/g at a relative vapor pressure of 0.02 and is at least 0.13 g/g at a relative vapor pressure of 0.1, and the zeolite has a relative vapor pressure region to give an adsorbate adsorption amount change of at least 0.08 g/g when the relative vapor pressure thereof has changed by 0.05 in a range of the relative vapor pressure thereof of from 0.02 to 0.1.

6. The regenerator system as claimed in claim 5, wherein the adsorbate adsorption amount is at most 0.1 g/g at a relative vapor pressure of 0.02, and is at least 0.15 g/g at a relative vapor pressure of 0.1.

7. The regenerator system as claimed in claim 5, wherein the heat in (1) is supplied to the devices to be warmed up and the latent heat of vaporization in (2) is supplied to the cooling medium.

8. The regenerator system as claimed in claim 5, which is mounted on vehicles and in which the waste heat is generated by the warmed-up internal combustion engine in vehicles, the devices to be warmed up are internal combustion engines, and the refrigerator for cooling is a vapor compression-type refrigerator.

9. The regenerator system as claimed in claim 5, wherein the adsorbate is water.

10. An adsorbent comprising zeolite, wherein (a) a framework density of the zeolite falls between 10 T/nm$^3$ and 18 T/nm$^3$, and (b) on the adsorption isotherm thereof measured at 55° C., the adsorbate adsorption amount by the zeolite is at most 0.12 g/g at a relative vapor pressure of 0.02 and is at least 0.13 g/g at a relative vapor pressure of 0.1, and the zeolite has a relative vapor pressure region to give an adsorbate adsorption amount change of at least 0.08 g/g when the relative vapor pressure thereof has changed by 0.05 in a range of the relative vapor pressure thereof of from 0.02 to 0.1.

11. The adsorbent as claimed in claim 10, wherein the adsorbate adsorption amount is at most 0.1 g/g at a relative vapor pressure of 0.02, and is at least 0.15 g/g at a relative vapor pressure of 0.1.

12. The adsorbent as claimed in claim 10, wherein the zeolite is an aluminophosphate that comprises at least Al and P in its framework structure.

13. The adsorbent as claimed in claim 10, wherein the zeolite is a metalloaluminophosphate that comprises at least a hetero atom, Al and P in its framework structure.

14. The adsorbent as claimed in claim 13, which comprises the hetero atom, Al and P in a molar ration of the following formulae (a) to (c):

$$0.001 \leq x \leq 0.4 \tag{a}$$

wherein x indicates a molar ratio of the hetero atom, to the total of the hetero atom, Al and P;

$$0.2 \leq y \leq 0.6 \tag{b}$$

wherein y indicates a molar ratio of Al to the total of the hetero atom, Al and P;

$$0.2 \leq z \leq 0.6 \tag{c}$$

wherein z indicates a molar ratio of P to the total of the hetero atom, Al and P.

15. The adsorbent as claimed in claim 13, wherein the zeolite is a silicoaluminophosphate that comprises silicon as the hetero atom in the framework structure thereof.

16. The adsorbent as claimed in claim 15, wherein the silicoaluminophosphate has a framework density of from 10 T/nm$^3$ to 16 T/nm$^3$, and the molar ratio of Si to the total of Si, Al and P is larger than 9%.

17. The adsorbent as claimed in claim 15, wherein the silicoaluminophosphate has a framework density of from 10 T/nm$^3$ to 16 T/nm$^3$, and Si, Al and P constitute the framework structure thereof in a molar ratio of the following formulae (4) to (6):

$$0.09 < p \leq 0.30 \tag{4}$$

wherein p indicates a molar ratio of Si to the total of Si, Al and P;

$$0.30 \leq q \leq 0.60 \tag{5}$$

wherein q indicates a molar ratio of Al to the total of Si, Al and P;

$$0.30 \leq r \leq 0.60 \tag{6}$$

wherein r indicates a molar ratio of P to the total of Si, Al and P.

18. The adsorbent as claimed in claim 13, wherein the zeolite is a ferroaluminophosphate that comprises iron as the hetero atom in the framework structure thereof.

19. The adsorbent as claimed in claim 10, wherein the adsorbate adsorption amount is at most 0.05 g/g at a relative vapor pressure of 0.02, and is at least 0.2 g/g at a relative vapor pressure of 0.1, and gives an adsorbate adsorption amount change of at least 0.12 g/g when the relative vapor pressure thereof has changed by 0.05 in a range of the relative vapor pressure thereof of from 0.02 to 0.1.

20. The adsorbent as claimed in claim 10, wherein the adsorbate adsorption amount is at most 0.1 g/g at a relative vapor pressure of 0.02, and is at least 0.15 g/g at a relative vapor pressure of 0.07, and gives an adsorbate adsorption amount change of at least 0.08 g/g when the relative vapor pressure thereof has changed by 0.05 in a range of the relative vapor pressure thereof of from 0.02 to 0.07.

21. A ferroaluminophosphate which has at least Fe, Al and P in the framework structure thereof and wherein its powdery X-ray diffractiometry with a Cu—Kα ray having an X-ray wavelength of 1.5418 Å gives diffraction peaks at least at diffraction angles (2θ) of 9.5±0.3, 10.1±0.3, 12.8±0.3, 19.5±0.3, 20.4±0.3, 24.3±0.3 and 30.7±0.4.

22. The ferroaluminophosphate as claimed in claim 21, wherein the peak intensity appearing at a diffraction angle (2θ) of 10.1±0.3 is at least 10% or more of the peak intensity appearing at a diffraction angle (2θ) of 9.5±0.3.

23. The ferroaluminophosphate as claimed in claim 21 or 22, the peak intensity appearing at a diffraction angle (2θ) of 19.5±0.3 is at least 10% or more of the peak intensity appearing at a diffraction angle (2θ) of 9.5±0.3.

24. The ferroaluminophosphate as claimed in claim 21, wherein Fe, Al and P form its framework structure in a molar ratio of the following formulae (1) to (3):

$$0.001 \leq x \leq 0.3 \quad (1)$$

wherein x indicates a molar ratio of Fe to the total of Fe, Al and P;

$$0.2 \leq y \leq 0.6 \quad (2)$$

wherein y indicates a molar ratio of Al to the total of Fe, Al and P;

$$0.3 \leq z \leq 0.6 \quad (3)$$

wherein z indicates a molar ratio of P to the total of Fe, Al and P.

25. The ferroaluminophosphate as claimed in claim 21, which has a framework density between 10 T/nm³ and 18 T/nm³, and has, on its adsorption isotherm measured at 55° C., an adsorbate adsorption amount of at most 0.12 g/g at a relative vapor pressure of 0.02 and at least 0.13 g/g at a relative vapor pressure of 0.1, while having a relative vapor pressure region to give an adsorbate adsorption amount change of at least 0.08 g/g when the relative vapor pressure thereof has changed by 0.05 in a range of the relative vapor pressure thereof of from 0.02 to 0.1.

26. The ferroaluminophosphate as claimed in claim 21, which is for a water vapor adsorbent.

27. An adsorbent which is (1) for feeding waste heat thereto so as to desorb the adsorbate from it and to feed the heat that is generated while the adsorbent adsorbs the adsorbate, to the devices to be warmed up, and/or (2) for feeding waste heat to it so as to desorb the adsorbate from it and to feed the latent heat of vaporization generated while the adsorbate vaporizes and is adsorbed to the adsorbent, to the cooling medium that circulates inside a refrigerator for cooling, wherein the adsorbent is the ferroaluminophosphate of claim 26.

28. A method for producing the ferroaluminophosphate of claim 21, which comprises calcining a ferroaluminophosphate that gives, in its powdery X-ray diffractiometry with a Cu—Kα ray having an X-ray wavelength of 1.5418 Å, diffraction peaks at least at diffraction angles (2θ) of 9.5+0.3, 13.1±0.3, 16.0±0.3, 20.7±0.3, 26.0±0.3 and 30.8±0.4, in an oxygen-containing gas.

* * * * *